United States Patent [19]

Ohki et al.

[11] Patent Number: 5,586,202

[45] Date of Patent: Dec. 17, 1996

[54] MOTION DETECTING APPARATUS

[75] Inventors: Mitsuharu Ohki; Katsuji Igarashi, both of Tokyo, Japan

[73] Assignee: Sony Corporation, Tokyo, Japan

[21] Appl. No.: 286,388

[22] Filed: Aug. 5, 1994

Related U.S. Application Data

[63] Continuation of Ser. No. 827,991, Jan. 29, 1992, abandoned.

[30] Foreign Application Priority Data

| Jan. 31, 1991 | [JP] | Japan | 3-010551 |
| Feb. 5, 1991 | [JP] | Japan | 3-014310 |
| Feb. 15, 1991 | [JP] | Japan | 3-022302 |

[51] Int. Cl.$^6$ .................................................. G06K 9/36
[52] U.S. Cl. ...................... 382/236; 382/107; 382/304; 382/294; 348/402; 348/413; 348/416
[58] Field of Search ............................... 382/56, 1, 236, 382/304, 294, 291, 107; 348/401, 402, 413, 416

[56] References Cited

U.S. PATENT DOCUMENTS

| 4,691,230 | 9/1987 | Kaneko et al. | 358/105 |
| 4,800,425 | 1/1989 | Schwerzel et al. | 358/105 |
| 4,937,666 | 6/1990 | Yang | 358/136 |
| 5,099,325 | 3/1992 | Artieri et al. | 358/136 |
| 5,142,361 | 8/1992 | Tayama et al. | 358/105 |
| 5,157,732 | 10/1992 | Ishii et al. | 358/105 |

FOREIGN PATENT DOCUMENTS

| 8908891 | 9/1989 | WIPO | G06F 15/70 |

*Primary Examiner*—Leo Boudreau
*Assistant Examiner*—David R. Anderson, Jr.
*Attorney, Agent, or Firm*—Jay H. Maioli

[57] ABSTRACT

A motion detecting apparatus in which when pixels within a search range formed of a predetermined number of pixels and pixels within a reference data block the number of which is smaller than the predetermined number of pixels in the search range, are compared on the basis of the arrangement state thereof, a processing circuit processes sums of difference absolute values of respective pixels within the reference data block and corresponding pixels within the search range formed at every search range, to thereby detect a motion state on the basis of the sums. Respective pixels within the search range are input to the processing circuit at a set time and pixels within the search range are input to the processing circuit at the set time, thereby being sequentially processed with corresponding pixels within the data block.

6 Claims, 24 Drawing Sheets

FIG. 2 (PRIOR ART)

| A0 | A6  | A12 | A18 | A24 | A30 |
|----|-----|-----|-----|-----|-----|
| A1 | A7  | A13 | A19 | A25 | A31 |
| A2 | A8  | A14 | A20 | A26 | A32 |
| A3 | A9  | A15 | A21 | A27 | A33 |
| A4 | A10 | A16 | A22 | A28 | A34 |
| A5 | A11 | A17 | A23 | A29 | A35 |

FIG. 4A

| b00 | b01 | b02 | b03 | b04 |
|---|---|---|---|---|
| b10 | b11 | b12 | b13 | b14 |
| b20 | b21 | b22 | b23 | b24 |
| b30 | b31 | b32 | b33 | b34 |
| b40 | b41 | b42 | b43 | b44 |

Search Range ( 5 x 5 )

FIG. 4B

| a00 | a01 | a02 |
|---|---|---|
| a10 | a11 | a12 |
| a20 | a21 | a22 |

Reference Data Block ( 3 x 3 )

FIG.5A

| A0 | A3 | A6 | C0 | C3 |
|----|----|----|----|----|
| A1 | A4 | A7 | C1 | C4 |
| A2 | A5 | A8 | C2 | C5 |
| B0 | B3 | B6 | D0 | D3 |
| B1 | B4 | B7 | D1 | D4 |

Search Range ( 5 x 5 )

FIG.5B

| $a_{00}$ | $a_{01}$ | $a_{02}$ |
|----------|----------|----------|
| $a_{10}$ | $a_{11}$ | $a_{12}$ |
| $a_{20}$ | $a_{21}$ | $a_{22}$ |

Reference Data Block ( 3 x 3 )

| $a_0$ | $a_6$ | $a_{12}$ | $a_{18}$ | $a_{24}$ | $a_{30}$ |
|---|---|---|---|---|---|
| $a_1$ | $a_7$ | $a_{13}$ | $a_{19}$ | $a_{25}$ | $a_{31}$ |
| $a_2$ | $a_8$ | $a_{14}$ | $a_{20}$ | $a_{26}$ | $a_{32}$ |
| $a_3$ | $a_9$ | $a_{15}$ | $a_{21}$ | $a_{27}$ | $a_{33}$ |
| $a_4$ | $a_{10}$ | $a_{16}$ | $a_{22}$ | $a_{28}$ | $a_{34}$ |
| $a_5$ | $a_{11}$ | $a_{17}$ | $a_{23}$ | $a_{29}$ | $a_{35}$ |

FIG. 22

| $a_7$ | $a_{13}$ | $a_{19}$ | $a_{25}$ |
|---|---|---|---|
| $a_8$ | $a_{14}$ | $a_{20}$ | $a_{26}$ |
| $a_9$ | $a_{15}$ | $a_{21}$ | $a_{27}$ |
| $a_{10}$ | $a_{16}$ | $a_{22}$ | $a_{28}$ |

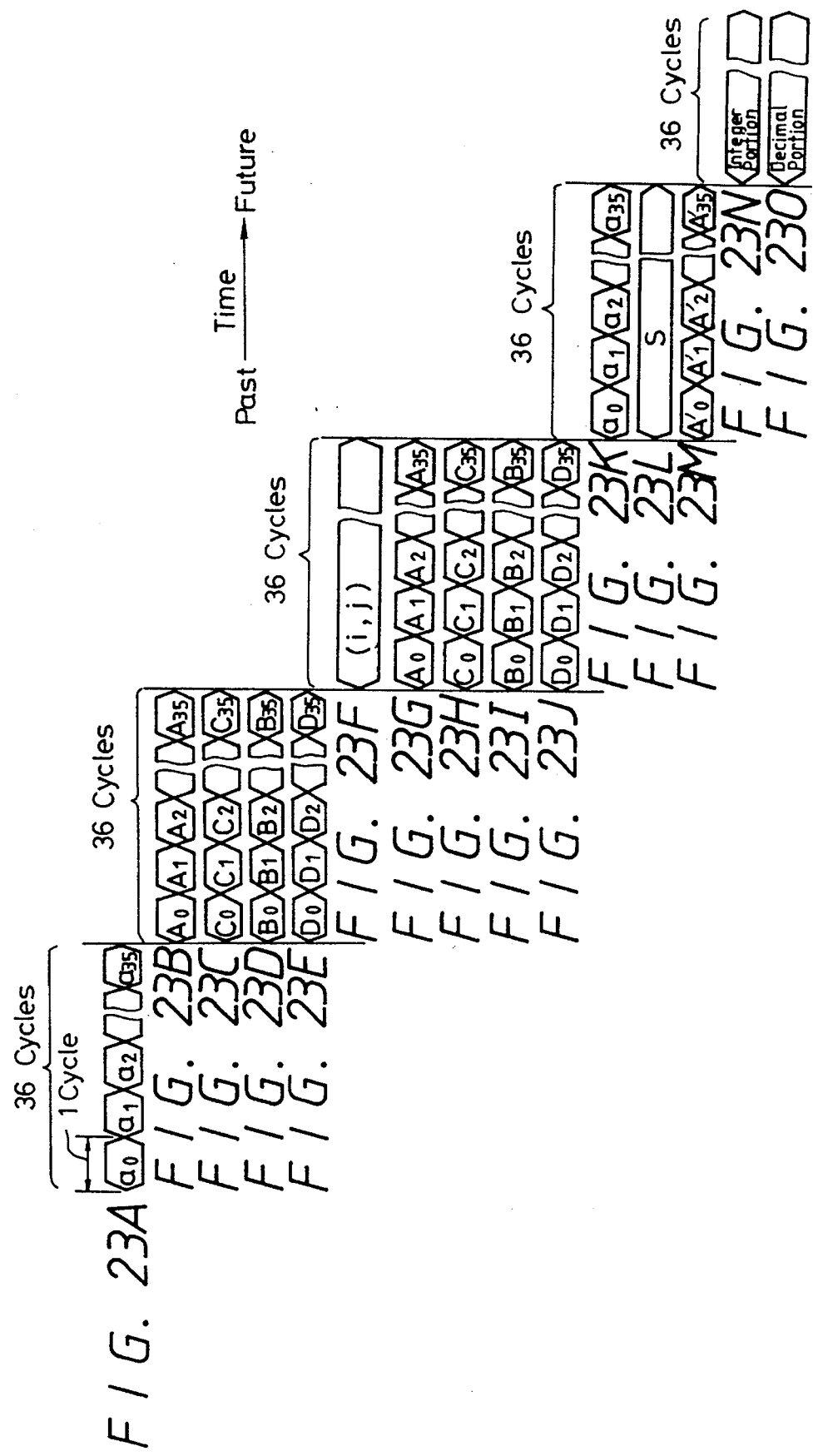

FIG. 24A
FIG. 24B
FIG. 24C
FIG. 24D
FIG. 24E
FIG. 24F
FIG. 24G
FIG. 24H
FIG. 24I
FIG. 24J
FIG. 24K
FIG. 24L
FIG. 24M
FIG. 24N

MOTION DETECTING APPARATUS

This is a continuation of application Ser. No. 07/827,991, filed Jan. 29, 1992, now abandoned.

BACKGROUND OF THE INVENTION

1. Field of the Invention

The present invention generally relates to motion detecting apparatus and, more particularly, to a motion detecting apparatus suitable for detecting a motion vector or the like when real moving image data is coded at high efficiency, for example.

2. Description of the Prior Art

Motion detecting apparatus are used to detect a motion vector when a real moving image data is processed in high efficiency coding process. In such motion detecting apparatus, when a motion is detected, for example, in a full search block matching process, a difference absolute value $m_{ij}$ at every pixel is calculated as:

$$m_{ij} = \sum_I \sum_J |b_{i+I, j+J} - a_{IJ}| \quad (1)$$

where $b_{ij}$ is a pixel in a search range and $a_{ij}$ is a pixel of reference data block.

In this case, a relation between $b_{i+I, j+J}$ and $a_{IJ}$ is complex and accordingly, all data ($b_{ij}$) of the search range, for example, are written in a memory fabricated within an LSI (large scale integrated circuit) and data $b_{ij}$ corresponding to $a_{IJ}$ is read out from the above memory. Then, the calculation is carried out. As a consequence, the conventional apparatus needs an internal memory that when fabricated as an LSI, which unavoidably increases the circuit scale.

Further, when a motion vector is detected in the high efficiency coding process of, for example, real moving image data, for example, when a motion is detected in a full search block matching process, a motion detecting apparatus is used, in which pixels consisting of a predetermined number of pixels within a search range and pixels consisting of pixels of the number smaller than the former pixels within a reference data block are compared on the basis of an arrayed state thereof. In such motion detecting apparatus, after a motion with typical 1 pixel (pel) accuracy is detected, vector data in 8 directions around the calculated vector are interpolated (i.e., mean value between two points), thereby obtaining predicted images which are shifted by 0.5 pel each. Then, for the predicted images, a vector is calculated in which a residual between the predicted image and an original image (reference data block) is minimized (i.e, motion is detected at the accuracy of a half pel).

Let it be assumed that a motion vector shown in FIG. 1 is calculated by carrying out a motion detection of 1 pel accuracy with respect to, for example, reference data block of 4×4 pixels. Assuming a residual of S at that time, then the following equality is established:

$$S = |A_7 - a_{14}| + |A_8 - a_{15}| + \ldots + |A_{28} - a_{35}|$$

where $a_i$ represent 16 pixels of reference data block as shown in FIG. 1B and $A_i$ represent 16 pixels corresponding to reference data block in which a motion detection is carried out at 1 pel accuracy within the search range as shown in FIG. 1A.

When on the other hand a motion is detected at the accuracy of a half pel (0.5 pel), as shown in FIG. 2, pixels (6×6 data) of a search range larger than the above-mentioned 16 $A_i$ are utilized and the following equation (2) is calculated to search for a minimum sum:

$$\begin{aligned}
\text{sum}(-0.5, -0.5) &= |(A_0 + A_7)/2 - a_{14}| + |(A_1 + A_8)/2 - a_{15}| + \ldots + |(A_{21} + A_{28})/2 - a_{35}| \\
\text{sum}(-0.5, 0) &= |(A_1 + A_7)/2 - a_{14}| + |(A_2 + A_8)/2 - a_{15}| + \ldots + |(A_{22} + A_{28})/2 - a_{35}| \\
\text{sum}(-0.5, +0.5) &= |(A_2 + A_7)/2 - a_{14}| + |(A_3 + A_8)/2 - a_{15}| + \ldots + |(A_{23} + A_{28})/2 - a_{35}| \\
\text{sum}(0, -0.5) &= |(A_6 + A_7)/2 - a_{14}| + |(A_7 + A_8)/2 - a_{15}| + \ldots + |(A_{27} + A_{28})/2 - a_{35}| \\
\text{sum}(0, 0) &= S \\
\text{sum}(0, +0.5) &= |(A_8 + A_7)/2 - a_{14}| + |(A_9 + A_8)/2 - a_{15}| + \ldots + |(A_{29} + A_{28})/2 - a_{35}| \\
\text{sum}(+0.5, -0.5) &= |(A_{12} + A_7)/2 - a_{14}| + |(A_{13} + A_8)/2 - a_{15}| + \ldots + |(A_{33} + A_{28})/2 - a_{35}| \\
\text{sum}(+0.5, 0) &= |(A_{13} + A_7)/2 - a_{14}| + |(A_{14} + A_8)/2 - a_{15}| + \ldots + |(A_{34} + A_{28})/2 - a_{35}| \\
\text{sum}(+0.5, +0.5) &= |(A_{14} + A_7)/2 - a_{14}| + |(A_{15} + A_8)/2 - a_{15}| + \ldots + |(A_{35} + A_{28})/2 - a_{35}|
\end{aligned}$$

However, when the motion detection of the half pel accuracy is carried out in the prior art, if the above equation (2) is directly calculated as described above, then each of $A_I + A_J$ in the equation (2) must be calculated. Further, a corresponding relation between $\lceil (A_I + A_J)/2 \rfloor$ and $\lceil r_{a_k} \rfloor$ is complicated so that the above equation (2) cannot be calculated without difficulty.

Furthermore, a third example of the conventional motion detecting apparatus will be described below.

In this conventional motion detecting apparatus, a processing is divided into a first stage in which a detection of 1 pixel (1 pel) accuracy is carried out and a second stage in which a detection of 0.5 pel (half pel) is carried out. As such motion detecting apparatus, the assignee of the present application has previously proposed a motion detecting apparatus, in which the detection of 1 pel accuracy is carried out on the basis of a so-called full search block matching process. Further, the assignee of the present application has proposed a motion detecting apparatus in which a detection of half pel accuracy is carried out after a detection of one pel accuracy is carried out.

More specifically, in such previously-proposed apparatus, when a motion detection of one pel accuracy is carried out, a sum of difference absolute values of respective pixels within a reference data block and corresponding pixels within a search range is calculated at every corresponding state of pixels which can be treated by a reference data block of g×p pixels within the search range of, for example, e×f pixels and the position of the block formed of g×p pixels in which the above sum becomes minimum is detected. On the other hand, when a motion detection of a half pel accuracy is carried out, then a mean value between adjacent pixels and a pixel within a reference data block are compared and difference absolute value sums are obtained at every corresponding state with respect to the pixels within the reference data block. When the motion detection of one pel accuracy is carried out, in the motion detection of half pel accuracy, (g+2)×(p+2) pixels which are expanded from the thus detected block of g×p pixels by one pixel each must be processed.

Accordingly, when an apparatus for detecting a motion of a half pel accuracy is arranged by coupling the above-mentioned two apparatus, then the above-mentioned proposed apparatus can perform a motion detection of one pel accuracy at g×p cycles and can perform a real time processing. However, when a motion of half pel accuracy is detected, (g+2)×(p+2) cycles must be provided for performing its process. As a consequence, when the latter processing is carried out in a real time fashion, the processing speed of the apparatus which carries out the motion detection of half pel accuracy must be increased by (g+2)×(p+2)/g×p times, which needs a special apparatus. Further, complicated circuits also must be provided in order to transfer image data.

OBJECTS AND SUMMARY OF THE INVENTION

Therefore, it is an object of the present invention to provide an improved motion detecting apparatus in which the aforesaid shortcomings and disadvantages encountered with the prior art can be eliminated.

More specifically, it is an object of the present invention to provide a motion detecting apparatus of simplified circuit arrangement which can detect a motion of one pel accuracy with ease.

It is another object of the present invention to provide a motion detecting apparatus of simplified circuit arrangement which can detect a motion of half pel accuracy with ease.

It is a further object of the present invention to provide a motion detecting apparatus of simplified circuit arrangement which can detect a motion of one pel accuracy and a motion of half pel accuracy simultaneously with ease.

As a first aspect of the present invention, a motion detecting apparatus is provided, in which when pixels within a search range formed of a predetermined number of pixels and pixels within a reference data block the pixel number of which is smaller than the predetermined number of pixels are compared on the basis of the arrangement state thereof, there is provided a processing circuit for processing sums of difference absolute values of respective pixels within the reference data block and corresponding pixels within the search range formed at every search range, to thereby detect a motion state on the basis of the sums. This motion detecting apparatus is characterized in that respective pixels within the search range are input to the processing circuit at a set time and pixels within the search range are input to the processing circuit at the set time, thereby being sequentially processed with corresponding pixels within the data block.

As a second aspect of the present invention, a motion detecting apparatus in which pixels within a search range formed of pixels of a predetermined number and pixels within a reference data block formed of pixels of the number smaller than the predetermined pixel number are compared on the basis of the arrayed state to thereby detect the motion state of pixels within the search range is comprised of an input unit to which pixels within the search range are input in a predetermined order, a calculating circuit for calculating a difference absolute value between the pixels within the search range and the corresponding pixels within the reference data block, and a detecting circuit for detecting the motion state on the basis of the calculated result, wherein the calculating circuit calculates a difference absolute value between pixels within the block and the corresponding pixels within the search range at every corresponding state of pixels which can be treated by the block within the search range and the calculation is carried out in parallel to each the corresponding state in accordance with the sequential order.

In accordance with a third aspect of the present invention, a motion detecting apparatus having a processing circuit for processing sums of difference absolute values of pixels within a reference data block formed by pixels of the number smaller than the predetermined pixel number and corresponding pixels within a search range formed by pixels of a predetermined number at every corresponding state of pixels of the block within the search range when pixels within the search range and pixels of the reference data block are compared on the basis of the arrayed state and in which the pixels within the search range are input to the processing circuit at a predetermined input cycle and pixels within the search range are input to the processing circuit on the basis of the cycle to thereby sequentially process the difference absolute value sum between corresponding pixels within the reference data block and pixels within the reference data block is characterized in that when a motion of less than one pixel is detected within the search range, a mean value between adjacent pixels and the pixel within the block are compared, the difference absolute value is obtained at every corresponding state with respect to the pixels within the block and a common processing between the corresponding states is carried out with a priority.

In accordance with a fourth aspect of the present invention, a motion detecting apparatus is comprised of a first processing circuit for processing sums of difference absolute values of pixels within a first reference data block formed by pixels of the number smaller than the predetermined pixel number and corresponding pixels within a search range formed by pixels of a predetermined number at every corresponding state of pixels of the block within the search range when pixels within the search range and pixels of the first reference data block are compared on the basis of the arranged state, and a second processing circuit for comparing a mean value of adjacent pixels and pixels within a second reference data block when a motion of less than one pixel within the search range is detected to thereby obtain a difference absolute value at every corresponding state with respect to the pixels within the second reference data block, wherein the number of pixels of the second reference data block is smaller than that of pixels within the first reference data block.

The above and other objects, features, and advantages of the present invention will become apparent in the following detailed description of illustrative embodiments thereof to be read in conjunction with the accompanying drawings, in which like reference numerals are used to identify the same or similar parts in the several views.

BRIEF DESCRIPTION OF THE DRAWINGS

FIG. 2 is a schematic diagram used to explain a motion detection of a half pel accuracy according to the prior art;

FIGS. 4A and 4B are respectively schematic diagrams used to explain the first embodiment;

FIGS. 5A and 5B are respectively schematic diagrams used to explain the first embodiment;

FIG. 14 is a schematic diagram used to explain the second embodiment;

FIG. 15 is a schematic diagram used to explain the second embodiment;

FIG. 19 is a schematic diagram showing a first reference data block used in the third embodiment;

FIG. 22 is a diagram showing a second reference data block;

FIGS. 23A through 23O are respectively timing charts used to explain operation of the whole of the motion detecting apparatus according to the third embodiment of the present invention;

FIGS. 24A through 24N are respectively timing charts used to explain operation of a main portion of the motion detecting apparatus according to the third embodiment of the invention.

DETAILED DESCRIPTION OF THE PREFERRED EMBODIMENTS

The present invention will now be described in detail with reference to the drawings.

Figure 3:
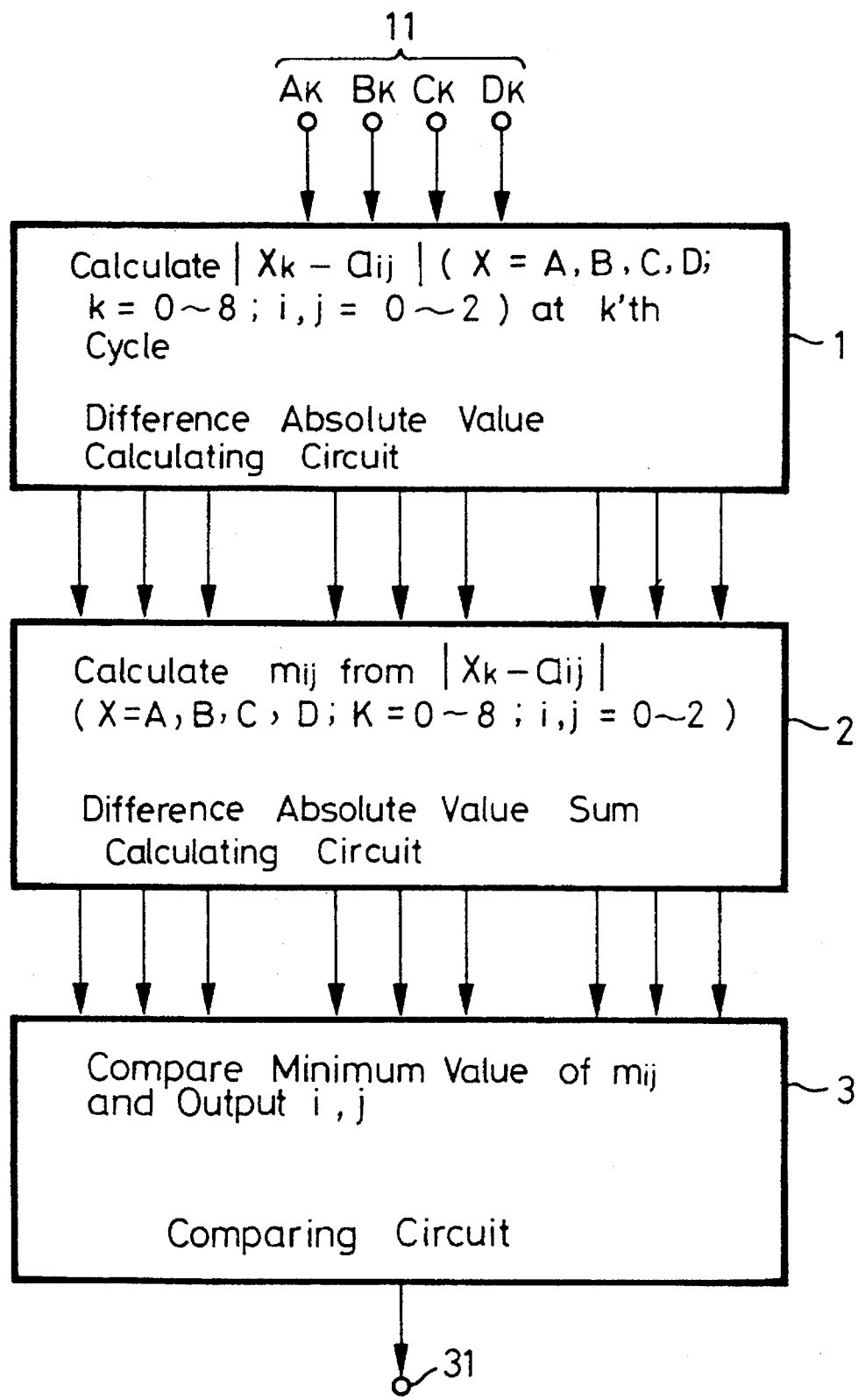
FIG. 3 is a conceptual diagram showing an arrangement of a first embodiment of a motion detecting apparatus according to the present invention.

FIG. 3 shows a conceptual diagram of a first embodiment of a motion detecting apparatus according to the present invention. In this embodiment, although a full search block matching process in which a search range is composed of 5×5 pixels and a reference data block is composed of 3×3 pixels in order to obtain a motion vector in a range of from (±1)×(±1) pixels is described as a specific example, such full search block matching process can be generalized (search range is composed of e×f pixels and reference data block is composed of g×p pixels).

Further, in FIG. 3, pixels $b_{ij}$ in the search range and pixels $a_{ij}$ in the reference data block are arranged as shown in FIGS. 4A and 4B. In this case, an upper leftmost suffix of the pixel in the search range is represented by (00). Accordingly, in this circuit, difference absolute value sums $m_{ij}$ when motion vectors are expressed as (ij) is expressed by the following equation (3):

$$m_{ij} = \sum_{I=0}^{2} \sum_{J=0}^{2} |b_{i+I,j+J} - a_{IJ}| \qquad (3)$$

Thus, 9 kinds of $m_{ij}$ where i=0 to 2 and j=0 to 2 are calculated in total, compared and then the minimum (ij) is calculated.

Herein, the above-mentioned pixels $b_{ij}$ in the search range are respectively denoted by $A_K$ $B_K$ $C_K$ $D_K$ as shown in FIG. 3. Thus, the difference absolute value sum $m_{ij}$ are expressed by the following equation (4):

$$\begin{aligned}
m_{00} &= |A_0 - a_{00}| + |A_1 - a_{10}| + |A_2 - a_{20}| + |A_3 - a_{01}| + |A_4 - a_{11}| + |A_5 - a_{21}| + |A_6 - a_{02}| + |A_7 - a_{12}| + |A_8 - a_{22}| \\
m_{10} &= |A_1 - a_{00}| + |A_2 - a_{10}| + |B_0 - a_{20}| + |A_4 - a_{01}| + |A_5 - a_{11}| + |B_3 - a_{21}| + |A_7 - a_{02}| + |A_8 - a_{12}| + |B_6 - a_{22}| \\
m_{20} &= |A_2 - a_{00}| + |B_0 - a_{10}| + |B_1 - a_{20}| + |A_5 - a_{01}| + |B_3 - a_{11}| + |B_4 - a_{21}| + |A_8 - a_{02}| + |B_6 - a_{12}| + |B_7 - a_{22}| \\
m_{01} &= |A_3 - a_{00}| + |A_4 - a_{10}| + |A_5 - a_{20}| + |A_6 - a_{01}| + |A_7 - a_{11}| + |A_8 - a_{21}| + |C_0 - a_{02}| + |C_1 - a_{12}| + |C_2 - a_{22}| \\
m_{11} &= |A_4 - a_{00}| + |A_5 - a_{10}| + |B_3 - a_{20}| + |A_7 - a_{01}| + |A_8 - a_{11}| + |B_6 - a_{21}| + |C_1 - a_{02}| + |C_2 - a_{12}| + |D_0 - a_{22}| \\
m_{21} &= |A_5 - a_{00}| + |B_3 - a_{10}| + |B_4 - a_{20}| + |A_8 - a_{01}| + |B_6 - a_{11}| + |B_7 - a_{21}| + |C_2 - a_{02}| + |D_0 - a_{12}| + |D_1 - a_{22}| \\
m_{02} &= |A_6 - a_{00}| + |A_7 - a_{10}| + |A_8 - a_{20}| + |C_0 - a_{01}| + |C_1 - a_{11}| + |C_2 - a_{21}| + |C_3 - a_{02}| + |C_4 - a_{12}| + |C_5 - a_{22}| \\
m_{12} &= |A_7 - a_{00}| + |A_8 - a_{10}| + |B_6 - a_{20}| + |C_1 - a_{01}| + |C_2 - a_{11}| + |D_0 - a_{21}| + |C_4 - a_{02}| + |C_5 - a_{12}| + |D_3 - a_{22}| \\
m_{22} &= |A_8 - a_{00}| + |B_6 - a_{10}| + |B_7 - a_{20}| + |C_2 - a_{01}| + |D_0 - a_{11}| + |D_1 - a_{21}| + |C_5 - a_{02}| + |D_3 - a_{12}| + |D_4 - a_{22}|
\end{aligned}$$

Rearranging the adding order in the equation (4), we have:

$m_{00} = |A_0 - a_{00}| + |A_1 - a_{10}| + |A_2 - a_{20}| + |A_3 - a_{01}| + |A_4 - a_{11}| + |A_5 - a_{21}| + |A_6 - a_{02}| + |A_7 - a_{12}| + |A_8 - a_{22}|$ $m_{10} = |B_0 - a_{20}| + |A_1 - a_{00}| + |A_2 - a_{10}| + |B_3 - a_{21}| + |A_4 - a_{01}| + |A_5 - a_{11}| + |B_6 - a_{22}| + |A_7 - a_{02}| + |A_8 - a_{12}|$ $m_{20} = |B_0 - a_{10}| + |B_1 - a_{20}| + |A_2 - a_{00}| + |B_3 - a_{11}| + |B_4 - a_{21}| + |A_5 - a_{01}| + |B_6 - a_{12}| + |B_7 - a_{22}| + |A_8 - a_{02}|$ $m_{01} = |C_0 - a_{02}| + |C_1 - a_{12}| + |C_2 - a_{22}| + |A_3 - a_{00}| + |A_4 - a_{10}| + |A_5 - a_{20}| + |A_6 - a_{01}| + |A_7 - a_{11}| + |A_8 - a_{21}|$ $m_{11} = |D_0 - a_{22}| + |C_1 - a_{02}| + |C_2 - a_{12}| + |B_3 - a_{20}| + |A_4 - a_{00}| + |A_5 - a_{10}| + |B_6 - a_{21}| + |A_7 - a_{01}| + |A_8 - a_{11}|$ $m_{21} = |D_0 - a_{12}| + |D_1 - a_{22}| + |C_2 - a_{02}| + |B_3 - a_{10}| + |B_4 - a_{20}| + |A_5 - a_{00}| + |B_6 - a_{11}| + |B_7 - a_{21}| + |A_8 - a_{01}|$ $m_{02} = |C_0 - a_{01}| + |C_1 - a_{11}| + |C_2 - a_{21}| + |C_3 - a_{02}| + |C_4 - a_{12}| + |C_5 - a_{22}| + |A_6 - a_{00}| + |A_7 - a_{10}| + |A_8 - a_{20}|$ $m_{12} = |D_0 - a_{21}| + |C_1 - a_{01}| + |C_2 - a_{11}| + |D_3 - a_{22}| + |C_4 - a_{02}| + |C_5 - a_{12}| + |B_6 - a_{20}| + |A_7 - a_{00}| + |A_8 - a_{10}|$ $m_{22} = |D_0 - a_{11}| + |D_1 - a_{21}| + |C_2 - a_{01}| + |D_3 - a_{12}| + |D_4 - a_{20}| + |C_5 - a_{02}| + |B_6 - a_{10}| + |B_7 - a_{20}| + |A_8 - a_{00}|$

In the above equation (5), if the absolute values on the right sides of respective equations are depicted as 0'th to 8th terms, then suffixes of A, B, C, and to D of respective terms are coincident with the numbers of the order of the terms. If on the other hand these suffixes represent that data are input at the corresponding cycles, then the value of the 0'th term of each equation can be calculated at the 0'th cycle by providing 9 calculating means of, for example, the difference absolute value [|(input data)−$a_{ij}$|] in parallel. Accordingly, values of the 1st to 8th terms can be calculated at the 1st to 8th cycles.

More specifically, in the conceptual diagram of FIG. 3, reference numeral 1 depicts a difference absolute value calculating circuit in which 9 means for calculating the above-mentioned difference absolute values are provided in parallel. The difference absolute value calculating circuit 1 includes four input terminals 11 and data $A_K$ to $D_K$ are respectively supplied to these input terminals 11 at k'th cycle. In this case, data B, D at 2nd and 5th cycles, data C, D at 6th and 7th cycles and data B, C, D at 8th cycle are not utilized in actual calculation as is clear from the equation (5) and therefore arbitrary dummy data are supplied to the input terminals 11 as data between the above-mentioned data. Thus, the difference absolute value calculating circuit 1 derives 9 values of respective terms at every cycle.

Nine data from the difference absolute value calculating circuit 1 are supplied to a difference absolute value sum calculating circuit 2. The difference absolute value sum calculating circuit 2 is comprised of 9 adding means and 9 registers (unit delay means) provided in parallel. Nine data of 0'th term supplied at the 0'th cycle are stored in the 9 registers. Nine data of 0'th term stored in the registers are added to 9 data of the 1st term supplied at the 1st cycle and then stored in the 9 registers. Then, 9 data of 2nd through 8th terms supplied at the 2nd to 8th cycles are sequentially added to 9 data stored in the registers, whereby the addition of respective terms is carried out in each equation of equation 5 to calculate the difference absolute values $m_{ij}$. The difference absolute values $m_{ij}$ obtained by the difference absolute value sum calculating circuit 2 are supplied to a difference absolute value sum comparing circuit 3 which obtains the minimum $m_{ij}$. Then, (ij) is supplied to an output terminal 31 as a motion vector.

As described above, according to the above-mentioned apparatus, since pixels within the search range are input in the predetermined order and then calculated, the memory housed in the apparatus becomes unnecessary and the motion detection can be carried out satisfactorily by the simple circuit arrangement.

Specific circuit arrangements of the difference absolute value calculating circuit 1 and the difference absolute value sum calculating circuit 2 will be described below. That is, while 9 k'th terms are calculated at the k'th cycle as described above, the circuit arrangement can be simplified more by determining specific calculating means for calculating k'th term of specific equation of the 9 calculating means provided in parallel.

Figure 6:
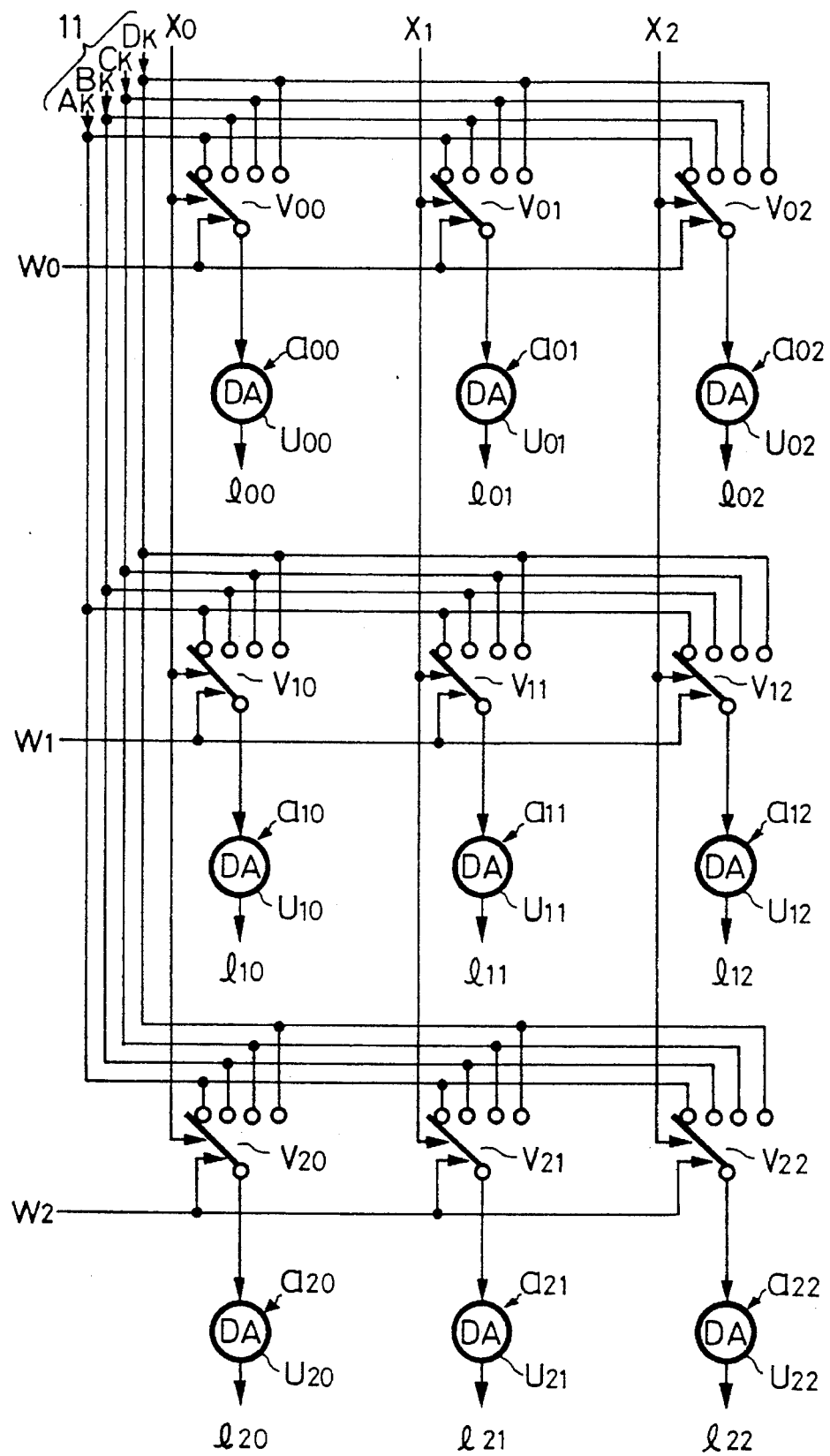
FIG. 6 is a schematic diagram showing an example of a difference absolute value calculating circuit used in the first embodiment.

FIG. 6 shows a specific example of the difference absolute value calculating circuit 1. Referring to FIG. 6, there are provided 9 absolute value calculating means (simply referred to as DA in FIG. 6) $U_{00}$ to $U_{22}$ and pixels $a_{00}$ to $a_{22}$ of respective reference data blocks are supplied to these calculating means $U_{00}$ to $U_{22}$. Also, these calculating means $U_{00}$ to $U_{22}$ are respectively supplied with data $A_K$ to $D_K$ selected by 4-input selectors $V_{00}$ to $V_{22}$ from the input terminal 11. The 4-input selectors $V_{00}$ to $V_{22}$ are respectively supplied with control signals $w_0$ to $w_2$ and $x_0$ to $x_2$ as shown in FIG. 6. When the control signals w and x are both low in level, then data $A_K$ is selected; when the control signal w is high in level and the control signal x is low in level, then the data $B_K$ is selected; when the control signal w is low in level and the control signal x is high in level, then the data $C_K$ is selected; and when the control signals w and x are both high in level, then the data $D_K$ is selected. Further, these control signals $w_0$ to $w_2$ and $x_0$ to $x_2$ are supplied in response to the cycles as shown on the following table 1.

TABLE 1

| | 0'TH CYCLE | 1ST CYCLE | 2ND CYCLE | 3RD CYCLE | 4TH CYCLE | 5TH CYCLE | 6TH CYCLE | 7TH CYCLE | 8TH CYCLE |
|---|---|---|---|---|---|---|---|---|---|
| $w_0$ control signal from terminal | L | L | L | L | L | L | L | L | L |
| $w_1$ control signal | H | L | L | H | L | L | H | L | L |

TABLE 1-continued

|  | 0'TH CYCLE | 1ST CYCLE | 2ND CYCLE | 3RD CYCLE | 4TH CYCLE | 5TH CYCLE | 6TH CYCLE | 7TH CYCLE | 8TH CYCLE |
|---|---|---|---|---|---|---|---|---|---|
| from terminal | | | | | | | | | |
| $w_2$ control signal from terminal | H | H | L | H | H | L | H | H | L |
| $x_0$ control signal from terminal | L | L | L | L | L | L | L | L | L |
| $x_1$ control signal from terminal | H | H | H | L | L | L | L | L | L |
| $x_2$ control signal from terminal | H | H | H | H | H | H | L | L | L |

L: low level
H: high level

Therefore, the respective calculating means $U_{00}$ to $U_{22}$ derive values $I_{00}$ to $I_{22}$ of terms involving $a_{00}$ to $a_{22}$ in the equation (5) at every cycle. Assuming that $I_{ij(t)}$ is a value of $I_{ij}$ of t'th cycle, then the above-mentioned equation (5) is rewritten as:

$$m_{00} = 1_{00(0)} + 1_{10(1)} + 1_{20(2)} + 1_{01(3)} + 1_{11(4)} + 1_{21(5)} + 1_{02(6)} + 1_{12(7)} + 1_{22(8)}$$
$$m_{10} = 1_{20(0)} + 1_{00(1)} + 1_{10(2)} + 1_{21(3)} + 1_{01(4)} + 1_{11(5)} + 1_{22(6)} + 1_{02(7)} + 1_{12(8)}$$
$$m_{20} = 1_{10(0)} + 1_{20(1)} + 1_{00(2)} + 1_{11(3)} + 1_{21(4)} + 1_{01(5)} + 1_{12(6)} + 1_{22(7)} + 1_{02(8)}$$
$$m_{01} = 1_{02(0)} + 1_{12(1)} + 1_{22(2)} + 1_{00(3)} + 1_{10(4)} + 1_{20(5)} + 1_{01(6)} + 1_{11(7)} + 1_{21(8)}$$
$$m_{11} = 1_{22(0)} + 1_{02(1)} + 1_{12(2)} + 1_{20(3)} + 1_{00(4)} + 1_{10(5)} + 1_{21(6)} + 1_{01(7)} + 1_{11(8)}$$
$$m_{21} = 1_{12(0)} + 1_{22(1)} + 1_{02(2)} + 1_{10(3)} + 1_{20(4)} + 1_{00(5)} + 1_{11(6)} + 1_{21(7)} + 1_{01(8)}$$
$$m_{02} = 1_{01(0)} + 1_{11(1)} + 1_{21(2)} + 1_{02(3)} + 1_{12(4)} + 1_{22(5)} + 1_{00(6)} + 1_{10(7)} + 1_{20(8)}$$
$$m_{12} = 1_{21(0)} + 1_{01(1)} + 1_{11(2)} + 1_{22(3)} + 1_{02(4)} + 1_{12(5)} + 1_{20(6)} + 1_{00(7)} + 1_{10(8)}$$
$$m_{22} = 1_{11(0)} + 1_{21(1)} + 1_{01(2)} + 1_{12(3)} + 1_{22(4)} + 1_{02(5)} + 1_{10(6)} + 1_{20(7)} + 1_{00(8)}$$

Figure 7:
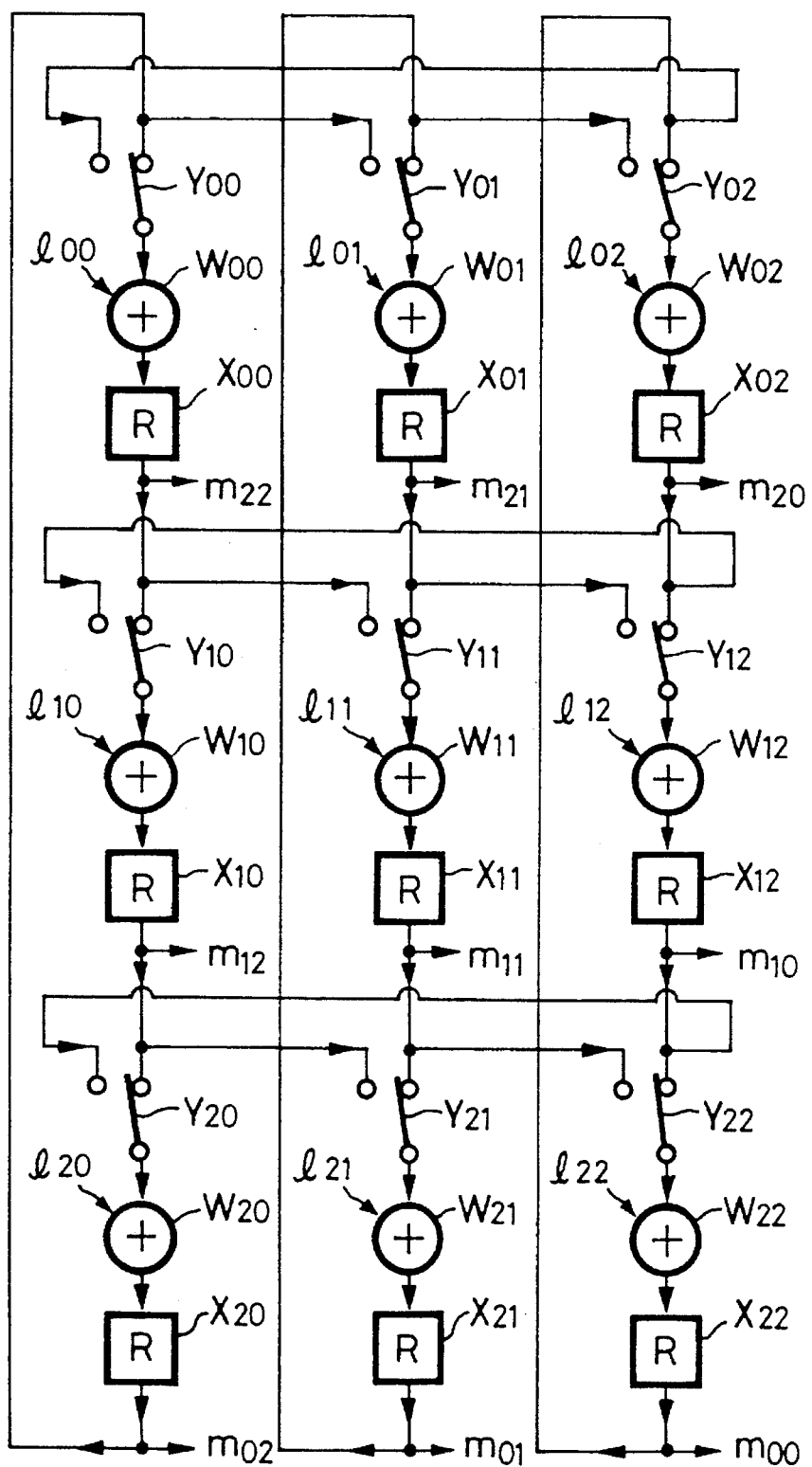
FIG. 7 is a schematic diagram showing an example of a difference absolute value sum calculating circuit used in the first embodiment.

FIG. 7 shows a specific example of the difference absolute value sum calculating circuit 2. Referring to FIG. 7, there are provided 9 adding means $W_{00}$ to $W_{22}$ and 9 registers $X_{00}$ to $X_{22}$. These adding means $W_{00}$ to $W_{22}$ are respectively supplied with the above-mentioned values $I_{00}$ to $I_{22}$. Outputs of these adding means $W_{00}$ to $W_{22}$ are respectively supplied to the registers $X_{00}$ to $X_{22}$. The registers $X_{00}$ to $X_{22}$ are driven at every cycle by a pulse similar to a data rate and reset at the 0'th cycle in response to a clear pulse. Outputs of these registers $X_{00}$ to $X_{22}$ are connected cyclically in the longitudinal direction through one of the terminals of 2-input selectors $Y_{00}$ to $Y_{22}$ and also connected cyclically in the lateral direction through the other terminals of the 2-input selectors $Y_{00}$ to $Y_{22}$. In this calculating circuit 2, the selectors $Y_{00}$ to $Y_{22}$ are connected to the first terminals at 1st, 2nd, 4th, 5th, 7th and 8th cycles and are connected to the other terminals at 0'th, 3rd and 6th cycles.

Thus, the addition of respective equations on the equation (6) is carried out and at the completion of the calculation at the 8th cycle, the difference absolute value sum $m_{ij}$ is stored in each of the registers $X_{00}$ to $X_{22}$. The storage position of the difference absolute value sum $m_{ij}$ is a point symmetry position with respect to the suffixes of the registers $X_{00}$ to $X_{22}$ about $X_{ij}$. Then, the difference absolute value sums $m_{ij}$ stored in these registers $X_{00}$ to $X_{22}$ are supplied to the comparing circuit 3 at the completion of the 8th cycle which then obtains the minimum $m_{ij}$, thereby the motion vector (ij) being calculated. A specific example of the comparing circuit 3 is well known and therefore need not be described.

Figure 8:
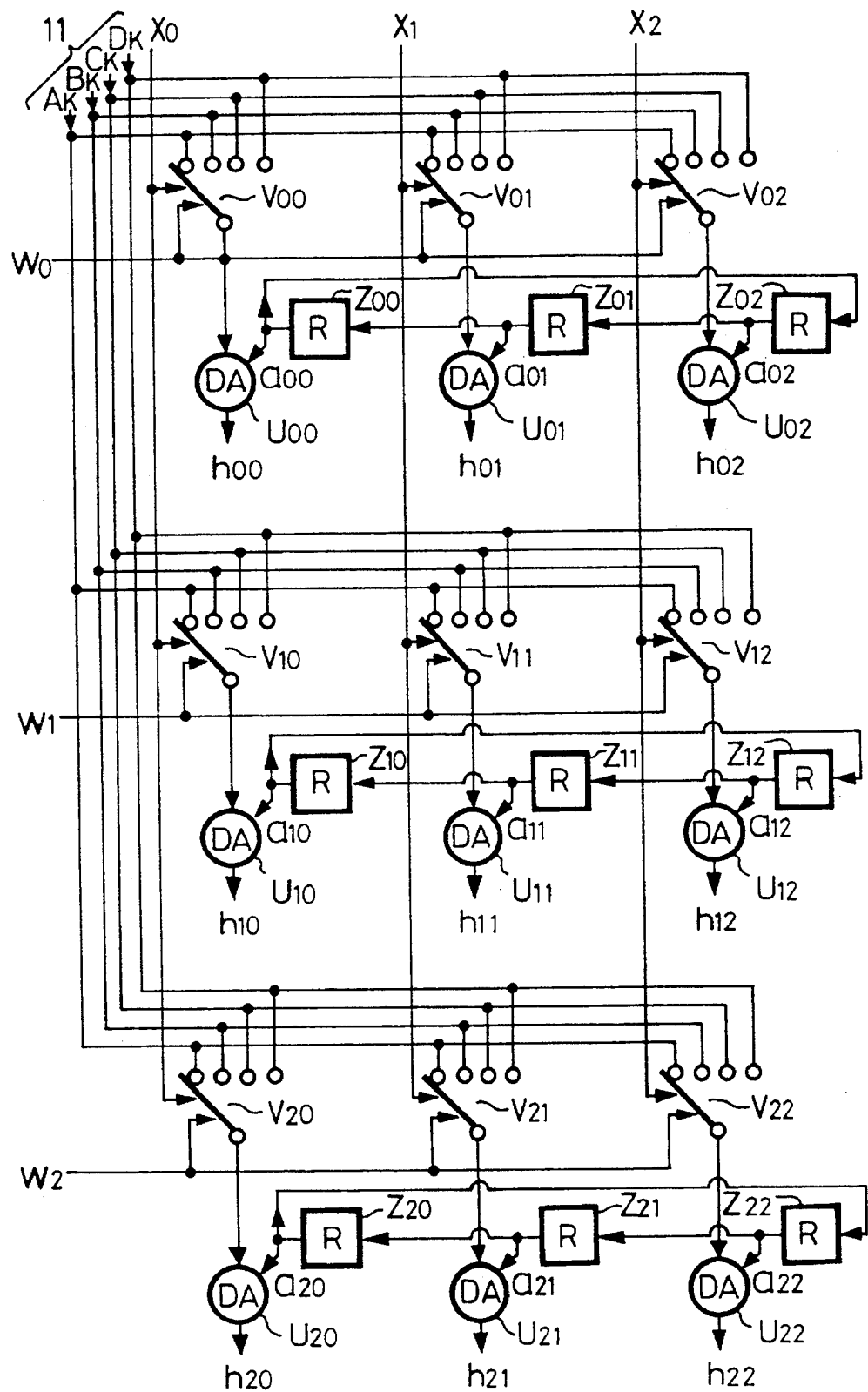
FIG. 8 is a schematic diagram showing another example of the difference absolute value calculating circuit used in the first embodiment.

FIG. 8 shows another specific example of the difference absolute value calculating circuit 1. Referring to FIG. 8, the 9 difference absolute value calculating means (simply referred to as DA in FIG. 8) $U_{00}$ to $U_{22}$ are cyclically supplied with the pixels $a_{00}$ to $a_{22}$ of respective reference data blocks, respectively. That is, 9 registers $Z_{00}$ to $Z_{22}$ are provided and outputs of these registers $Z_{00}$ to $Z_{22}$ are respectively supplied to the calculating means $U_{00}$ to $U_{22}$. Also, these registers $Z_{00}$ to $Z_{22}$ are cyclically coupled in the lateral direction. The pixels $a_{00}$ to $a_{22}$ are respectively stored in the registers $Z_{00}$ to $Z_{22}$ and these registers $Z_{00}$ to $Z_{22}$ are respectively supplied with a clock whose frequency is ⅓ of the input data rate. As a consequence, the calculating means $U_{00}$ to $U_{22}$ are cyclically supplied with the pixels $a_{00}$ to $a_{22}$ at every three cycles. Further, the control signals $W_0$ to $W_2$ and $X_0$ to $X_2$ supplied to the selectors $V_{00}$ to $V_{22}$ are supplied in response to the corresponding cycles as shown on the following table 2.

TABLE 2

|  | 0'TH CYCLE | 1ST CYCLE | 2ND CYCLE | 3RD CYCLE | 4TH CYCLE | 5TH CYCLE | 6TH CYCLE | 7TH CYCLE | 8TH CYCLE |
|---|---|---|---|---|---|---|---|---|---|
| $w_0$ control signal from terminal | L | L | L | L | L | L | L | L | L |
| $w_1$ | H | L | L | H | L | L | H | L | L |

TABLE 2-continued

| | 0'TH CYCLE | 1ST CYCLE | 2ND CYCLE | 3RD CYCLE | 4TH CYCLE | 5TH CYCLE | 6TH CYCLE | 7TH CYCLE | 8TH CYCLE |
|---|---|---|---|---|---|---|---|---|---|
| control signal from terminal $w_2$ | H | H | L | H | H | L | H | H | L |
| control signal from terminal $x_0$ | L | L | L | L | L | L | L | L | L |
| control signal from terminal $x_1$ | H | H | H | H | H | H | L | L | L |
| control signal from terminal $x_2$ | H | H | H | L | L | L | L | L | L |

L: low level
H: high level

Therefore, the calculating means $U_{00}$ to $U_{22}$ derive values $h_{00}$ to $h_{22}$ of the terms involving $a_{00}$ to $a_{22}$ of the equation (5) at each cycle. Assuming that $h_{ij(t)}$ is a value of $h_{ij}$ of the t'th cycle, then we have:

$$m_{00} = h_{00(0)} + h_{10(1)} + h_{20(2)} + h_{00(3)} + h_{10(4)} + h_{20(5)} + h_{00(6)} + h_{10(7)} + h_{20(8)}$$
$$m_{10} = h_{20(0)} + h_{00(1)} + h_{10(2)} + h_{20(3)} + h_{00(4)} + h_{10(5)} + h_{20(6)} + h_{00(7)} + h_{10(8)}$$
$$m_{20} = h_{10(0)} + h_{20(1)} + h_{00(2)} + h_{10(3)} + h_{20(4)} + h_{00(5)} + h_{10(6)} + h_{20(7)} + h_{00(8)}$$
$$m_{01} = h_{02(0)} + h_{12(1)} + h_{22(2)} + h_{02(3)} + h_{12(4)} + h_{22(5)} + h_{02(6)} + h_{12(7)} + h_{22(8)}$$
$$m_{11} = h_{22(0)} + h_{02(1)} + h_{12(2)} + h_{22(3)} + h_{02(4)} + h_{12(5)} + h_{22(6)} + h_{02(7)} + h_{12(8)}$$
$$m_{21} = h_{12(0)} + h_{22(1)} + h_{02(2)} + h_{12(3)} + h_{22(4)} + h_{02(5)} + h_{12(6)} + h_{22(7)} + h_{02(8)}$$
$$m_{02} = h_{01(0)} + h_{11(1)} + h_{21(2)} + h_{01(3)} + h_{11(4)} + h_{21(5)} + h_{01(6)} + h_{11(7)} + h_{21(8)}$$
$$m_{12} = h_{21(0)} + h_{01(1)} + h_{11(2)} + h_{21(3)} + h_{01(4)} + h_{11(5)} + h_{21(6)} + h_{01(7)} + h_{11(8)}$$
$$m_{22} = h_{11(0)} + h_{21(1)} + h_{01(2)} + h_{11(3)} + h_{21(4)} + h_{01(5)} + h_{11(6)} + h_{21(7)} + h_{01(8)}$$

Figure 9:
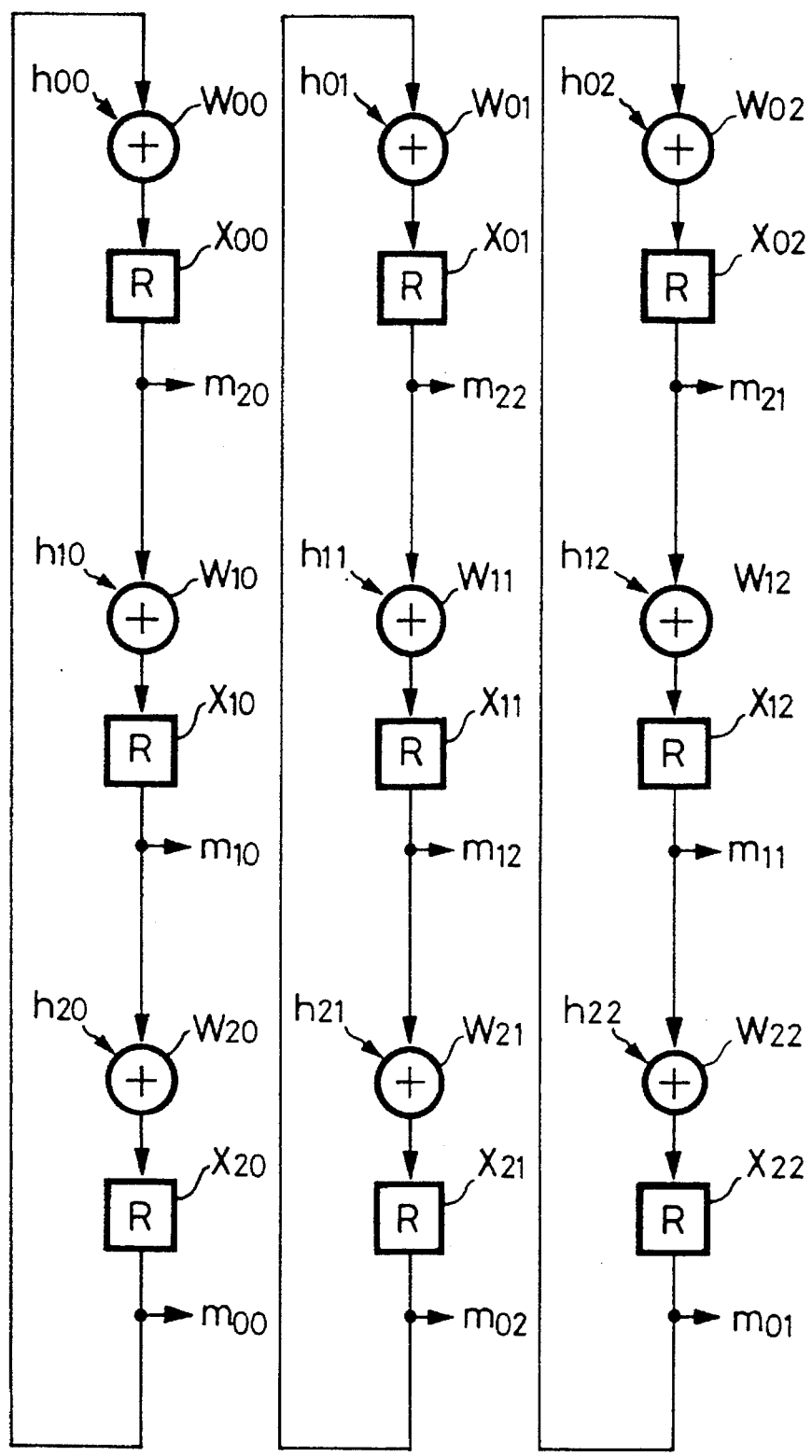
FIG. 9 is a schematic diagram showing another example of the difference absolute value sum calculating circuit used in the first embodiment.

FIG. 9 shows another specific example of the difference absolute value sum calculating circuit 2. Referring to FIG. 9, there are provided 9 adding means $W_{00}$ to $W_{22}$ and 9 registers $X_{00}$ to $X_{22}$, respectively. These adding means $W_{00}$ to $W_{22}$ are respectively supplied with the above-mentioned values $h_{00}$ to $h_{22}$ and outputs of these adding means $W_{00}$ to $W_{22}$ are respectively supplied to the registers $X_{00}$ to $X_{22}$. These registers $X_{00}$ to $X_{22}$ are driven at every cycle by a pulse similar to the data rate and reset at 0'th cycle in response to a clear pulse supplied thereto. In this difference absolute value sum calculating circuit 2, outputs of these registers $X_{00}$ to $X_{22}$ are cyclically coupled in the longitudinal direction, whereby the addition of each equation in the equation (7) is carried out. At the completion of the 8th cycle, the difference absolute value sums $m_{ij}$ are stored in the respective registers $X_{00}$ to $X_{22}$. In this case, the storing positions of the difference absolute value sums $m_{ij}$ are respectively as shown in FIG. 9.

The difference absolute value sums $m_{ij}$ stored in these registers $X_{00}$ to $X_{22}$ are supplied to the comparing circuit 3 at the end of the 8th cycle, wherein the minimum $m_{ij}$ is obtained to calculate the motion vector (ij). A specific example of the comparing circuit 3 is well known and therefore need not be described herein. In this fashion, the difference absolute value calculating circuit 1 and the difference absolute value sum calculating circuit 2 can be realized.

Figure 10:
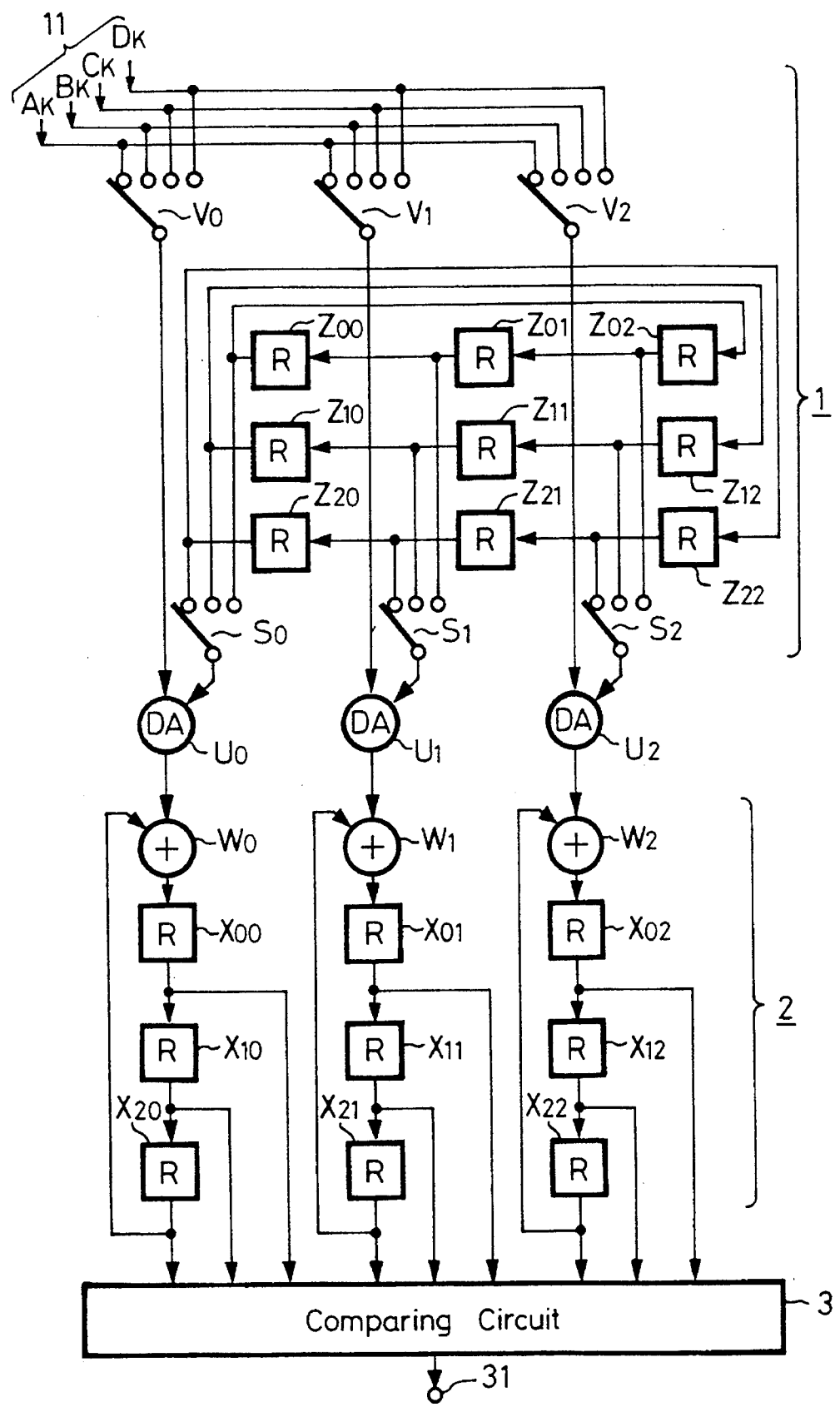
FIG. 10 is a schematic block diagram showing an example of the motion detecting apparatus which can be simplified by the time-division-multiplexing manner.

Further, in the circuit described in another specific example, if the processing speed of each of the calculating means is high sufficiently, then the circuit arrangement can be simplified more by employing a time division multiplexed processing manner. More specifically, FIG. 10 shows other example of the motion detecting apparatus of the present invention, in which the difference absolute value calculating circuit 1 of FIG. 8 and the difference absolute value sum calculating circuit 2 of FIG. 9 are driven in a triple time division processing fashion. As shown in FIG. 10, there are provided 3 difference absolute value calculating means $U_0$ to $U_2$ and 9 registers $Z_{00}$ to $Z_{22}$ also are provided so as to form three cyclic loops in the lateral direction. Outputs of these registers $Z_{00}$ to $Z_{22}$ are selected by 3-input selectors $S_0$ to $S_2$ and then fed to the calculating means $U_0$ to $U_2$. Further, 3 adding means $W_0$ to $W_2$ are provided and 9 registers $X_{00}$ to $X_2$ are connected in cascade. When these circuits are driven by a pulse whose frequency is three times as high as the data rate, the processing similar to the above can be carried out. The number of the calculating means and the adding means can be reduced as set forth above.

Figure 11:
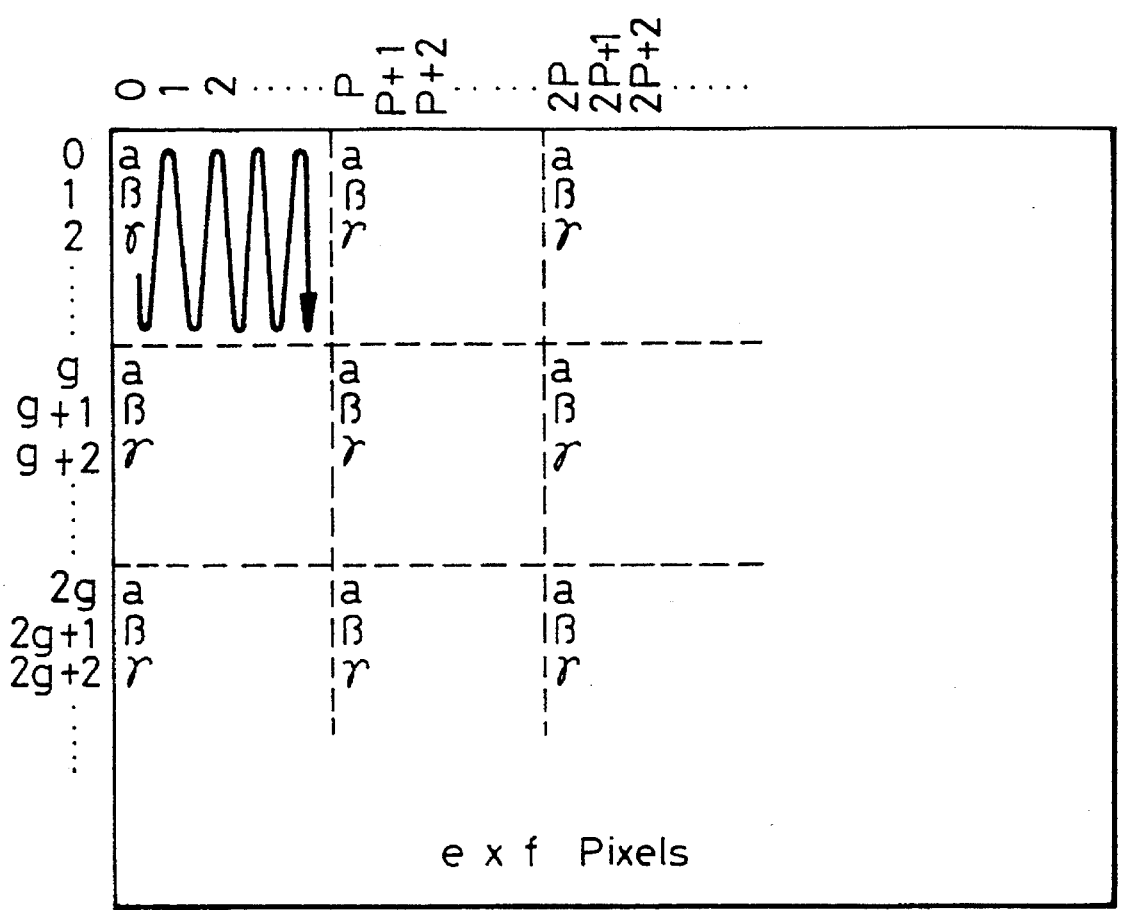
FIG. 11 is a schematic diagram used to explain the case such that the full search block matching is generalized.

In the above-mentioned embodiment, the full search block matching processing in which the search range is formed of 5×5 pixels and the reference data block is formed of 3×3 pixels is described. If this full search block matching processing is generalized in which, for example, the search range is formed of e×f pixels and the reference data block is formed of g×p pixels, then the motion detecting apparatus is operated as follows. In that event, the motion vector can be obtained in a range of $[\pm(e-g)/2]\times[\pm(f-p)/2]$. That is, the search range of e×f pixels is divided at every g×p pixels and then the processing is carried out as shown in FIG. 11.

Figure 12:
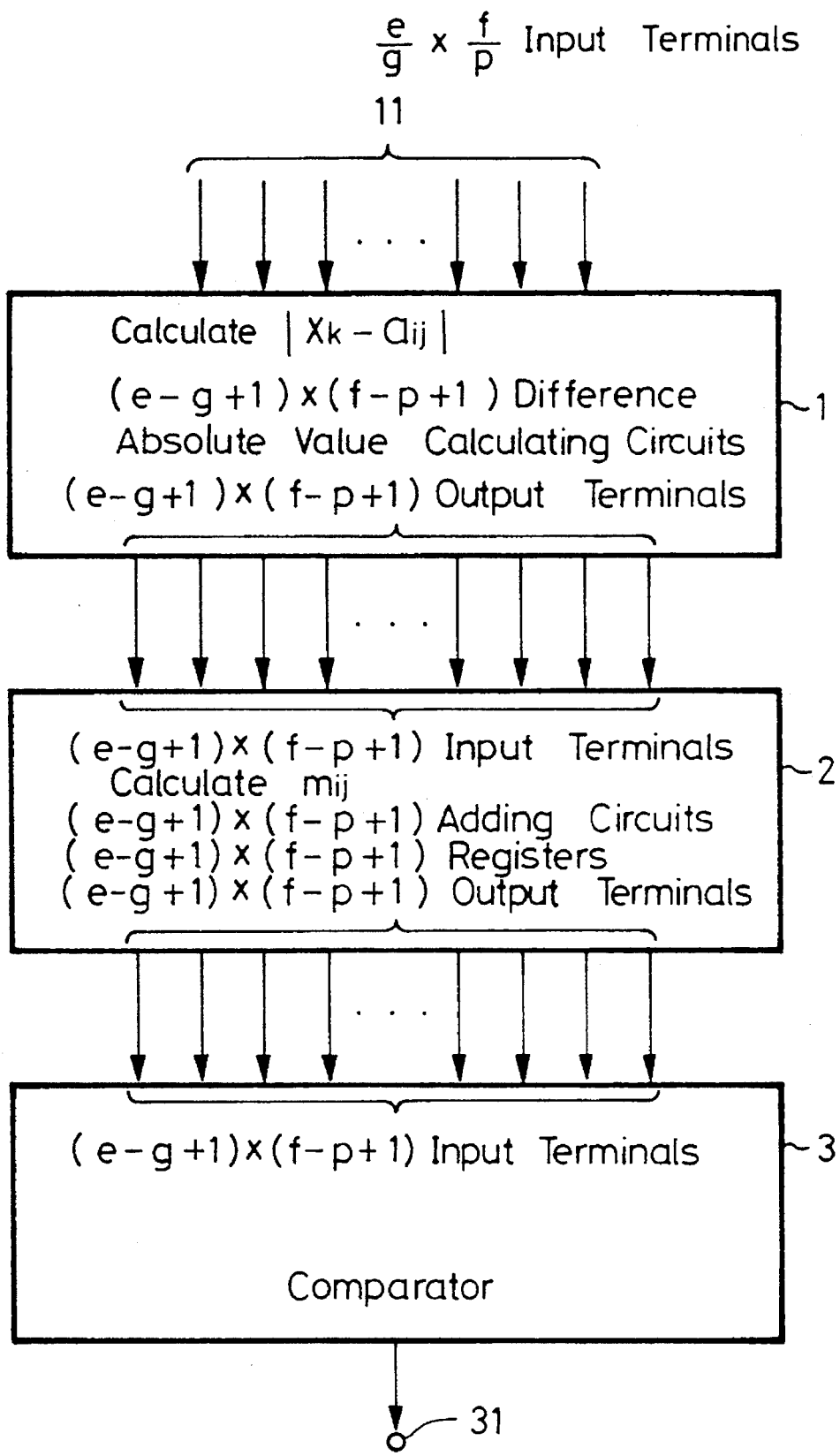
FIG. 12 is a conceptual diagram showing an arrangement of an example of a generalized motion detecting apparatus.

As shown in a conceptual diagram of FIG. 12, in that case, the difference absolute value calculating circuit 1 includes (e/g)×(f/p) input terminals 11 and the calculating circuit 1 includes (e−g+1)×(f−p+1) difference absolute value calculating means U. Then, at every divided search range, pixels constructing the search ranges are denoted as α, β, γ ... At the 0'th cycle, a pixel α [coordinates ($n_1$, g, $n_2$ p) is input to the input terminals 11; at the 1st cycle, pixel β [coordinates ($n_1$ g+1, $n_2$ p)$n_1$=0, 1, 2, ...; $n_2$=0, 1, 2, ... ] are input to the input terminals 11, and at the 2nd cycle, a pixel γ [coordinates ($n_1$ g+2, $n_2$ p)$n_1$=0, 1, 2, . . . ; $n_2$=0, 1, 2, . . . ] are input to the input terminals 11. Accordingly, the pixels α, β, γ . . . are sequentially input to the input terminals 11.

Further, (e–g+1)×(f–p+1) outputs from this difference absolute value calculating circuit 1 are supplied to the difference absolute value sum calculating circuit 2 composed of (e–g+1)×(f–p+1) adding means W and registers X. Then, (e–g+1)×(f–p+1) outputs from the difference absolute value sum calculating circuit 2 are supplied to the comparing circuit 3 which then obtains the minimum difference absolute value sum, thereby the motion vector being calculated. Also, in accordance with this circuit, the number of the calculating means and the adding means can be reduced in a time division multiplexed processing similar to the above one.

Furthermore, if means for calculating the square of the difference is employed instead of the difference absolute value calculating means U, then it becomes possible to arrange "full search block matching based on difference square sum minimum".

According to the above embodiment of the present invention, since the pixels within the search range are input in the predetermined order and then calculated, the internal memory becomes unnecessary and the satisfactory motion detection can be carried out by the simple circuit arrangement.

A second embodiment of the present invention will be described below.

In the foregoing equation (2), the number of additions can be reduced by bracketing a common term of 8 equations except sum (0,0). Further, by properly operating the input sequence of pixels, $\lceil (A_I+A_J)/2 \rfloor$ and $\lceil a_K \rfloor$ can be associated with ease and therefore the circuit scale of the motion detecting apparatus can be reduced. More specifically, according to the second embodiment, the above-mentioned equation (2) is modified as the following equation (8):

of the register 13g. A subtracted output from the subtracter 16 is supplied to the adders 14a through 14h. Added outputs from the adders 14a to 14h are respectively supplied through absolute value generating circuits (simply referred to as ABS in FIG. 13) 17a to 17h to accumulative-adder circuits (simply referred to as ACD in FIG. 13) 18a to 18h. The accumulative-adder circuits 18a to 18h are supplied with an enable control signal from a terminal 19.

Further, the residual S of the motion vector calculated by the above-mentioned motion detection of one pel accuracy is supplied to an input terminal 20. Then, the value of the residual S from the input terminal 20 and the added outputs from the accumulative-adder circuits 18a through 18h are supplied to a comparing circuit 30 which detects the minimum value. Then, a motion vector of the half pel accuracy is supplied to an output terminal 32.

Figures 1A, 1B:
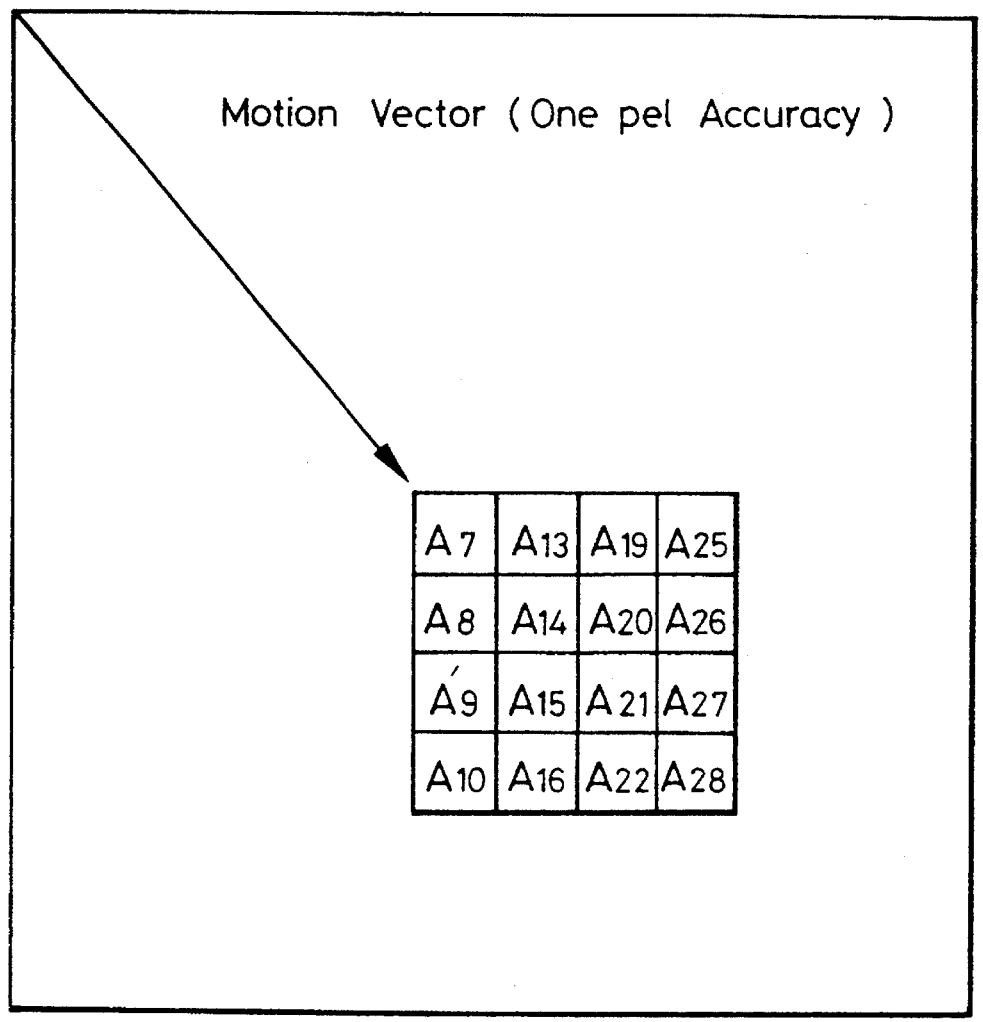
FIGS. 1A and 1B are respectively schematic diagrams used to explain a motion detection of 1 pel accuracy according to the prior art.

Accordingly, in this apparatus, data $A_i$ is input to the input terminal 10 at the i'th cycle and data $a_i$ is input to the input terminal 15 at the i'th cycle. Ai represents the pixels of the search range (6×6) of FIG. 2 and $a_i$ 16 pixels of the reference data block shown in FIG. 1B. In this case, i=0, 1, 2, . . . , 35. Although $a_0$ to $a_{13}$, $a_{18}$, $a_{19}$, $a_{24}$, $a_{25}$, $a_{30}$, and $a_{31}$ are not shown in FIG. 1B, dummy data are input to the input terminal 15 at corresponding 0'th to 13th, 18th, 19th, 24th, 25th, 30th and 31st cycles.

Therefore, according to this motion detecting apparatus, at the 14th cycle after the input of data is started, the register 13g derives $\lceil$ value which results from multiplying the value input to the input terminal 10 by ½ time and delaying the same by 7 cycles$\rfloor$, i.e., $\lceil A_7/2 \rfloor$ and at the same time, data $\lceil a_{14} \rfloor$ is input to the input terminal 15, whereby the subtracter 16 calculates $[(A_7/2)-a_{14}]$. At that time, the register 13n derives $\lceil$ value which results from multiplying the value input to the input terminal 10 by ½ time and delaying the same by 14 cycles$\rfloor$, i.e., $\lceil A_0/2 \rfloor$, whereby the adder 14h calculates $[(A_0/2)+\{(A_7/2)-a_{14}\}]$. The calculated value is converted into an absolute value $[|(A_0/2)+\{(A_7/2)-a_{14}\}|]$, by

---

$$\text{sum}(-0.5, -0.5) = |A_0/2 + (A_7/2 - a_{14})| + |A_1/2 + (A_8/2 - a_{15})| + \ldots + |A_{21}/2 + (A_{28}/2 - a_{35})|$$
$$\text{sum}(-0.5, 0) = |A_1/2 + (A_7/2 - a_{14})| + |A_2/2 + (A_8/2 - a_{15})| + \ldots + |A_{22}/2 + (A_{28}/2 - a_{35})|$$
$$\text{sum}(-0.5, +0.5) = |A_3/2 + (A_7/2 - a_{14})| + |A_3/2 + (A_8/2 - a_{15})| + \ldots + |A_{23}/2 + (A_{28}/2 - a_{35})|$$
$$\text{sum}(0, -0.5) = |A_6/2 + (A_7/2 - a_{14})| + |A_7/2 + (A_8/2 - a_{15})| + \ldots + |A_{27}/2 + (A_{28}/2 - a_{35})|$$
$$\text{sum}(0, 0) = S$$
$$\text{sum}(0, +0.5) = |A_8/2 + (A_7/2 - a_{14})| + |A_9/2 + (A_8/2 - a_{15})| + \ldots + |A_{29}/2 + (A_{28}/2 - a_{35})|$$
$$\text{sum}(+0.5, -0.5) = |A_{12}/2 + (A_7/2 - a_{14})| + |A_{13}/2 + (A_8/2 - a_{15})| + \ldots + |A_{33}/2 + (A_{28}/2 - a_{35})|$$
$$\text{sum}(+0.5, 0) = |A_{13}/2 + (A_7/2 - a_{14})| + |A_{14}/2 + (A_8/2 - a_{15})| + \ldots + |A_{34}/2 + (A_{28}/2 - a_{35})|$$
$$\text{sum}(+0.5, +0.5) = |A_{14}/2 + (A_7/2 - a_{14})| + |A_{15}/2 + (A_8/2 - a_{15})| + \ldots + |A_{35}/2 + (A_{28}/2 - a_{35})|$$

---

In the aforementioned equation (8), $[(A_7/2)-a_{14}]$, $[(A_8/2)-a_{15}]$, . . . , $[(A_{28}/2)-a_{35}]$ are common to 8 equations. Accordingly, if these subtractions are carried out just once, the subtracted value can be utilized in the 8 equations, thus making it possible to reduce the number of the additions and subtractions.

Figure 13:
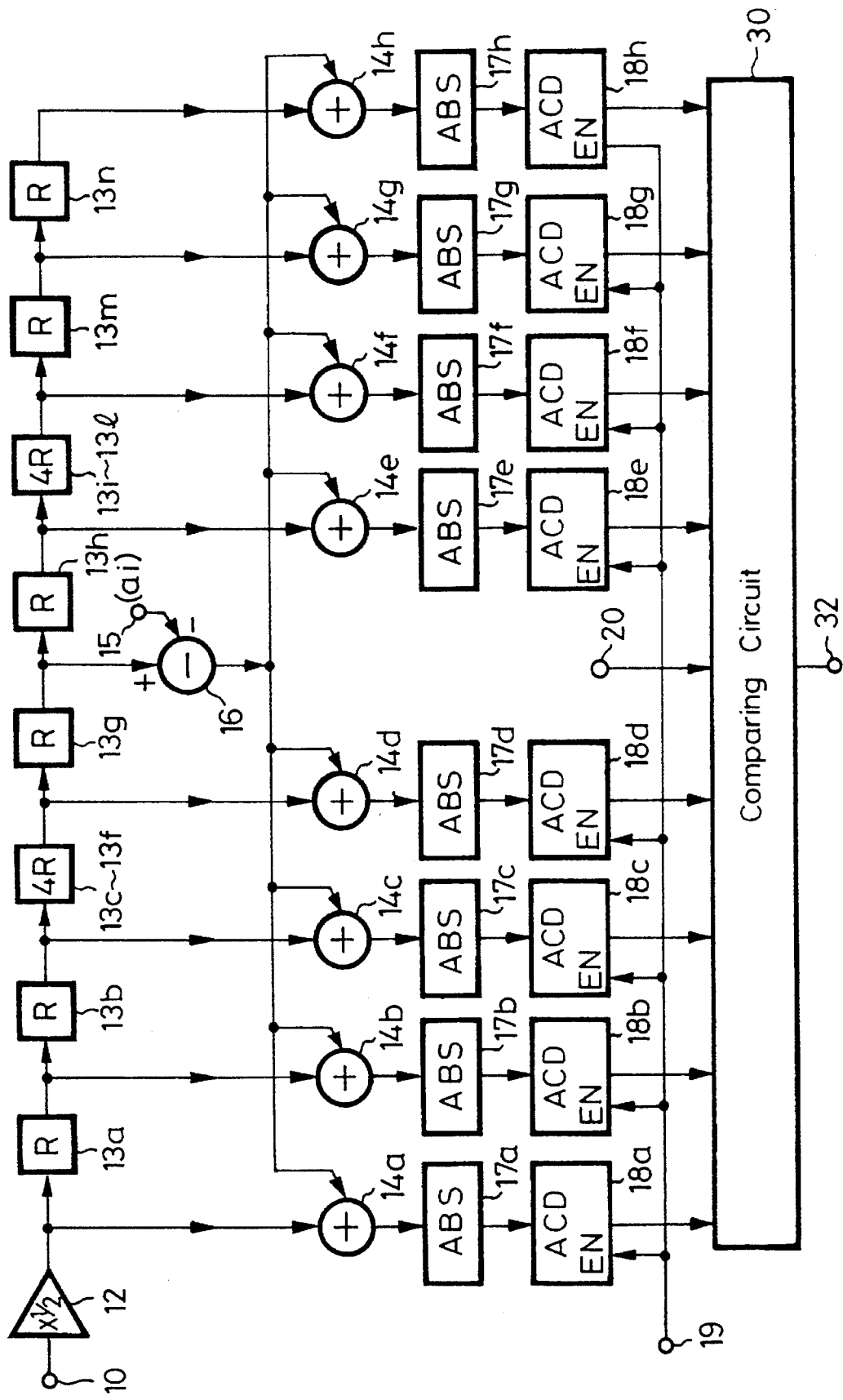
FIG. 13 is a schematic block diagram showing an arrangement of a second embodiment of the motion detecting apparatus according to the present invention.

FIG. 13 shows an arrangement of the motion detecting apparatus of this embodiment. Referring to FIG. 13, the above data A is supplied to an input terminal 10 and this data is shifted by one bit and then the value is reduced to a half by means 12. The resultant ½ value is supplied to registers 13a to 13n connected in series. The resultant ½ value and outputs of the registers 13a, 13b, 13f, 13h, 13l, 13m and 13n are respectively supplied-to adders 14a through 14h.

The above-mentioned data a is supplied to an input terminal 15. The data a at the input terminal 15 is supplied to a subtracter 16 and the output of the register 13g is supplied to the subtracter 16, in which the data a supplied to the input terminal 15 is subtracted from this value or output the absolute value generating circuit 17h which is then input to the accumulative-adder circuit 18h.

Similarly, the value $[(A_7/2)-a_{14}]$ calculated by the subtracter 16 is also input to the adders 14a to 14g so that $[(A_{14}/2)+\{(A_7/2)-a_{14}\}]$, $[(A_{13}/2)+\{(A_7/2)-a_{14}\}]$, $[(A_{12}/2)+\{(A_7/2)-a_{14}\}]$, $[(A_8/2)+\{(A_7/2)-a_{14}\}]$, $[(A_6/2)+\{(A_7/2)-a_{14}\}]$, $[(A_2/2)+\{(A_7/2)-a_{14}\}]$ and $[(A_1/2)+\{(A_7/2)-a_{14}\}]$ are respectively calculated. These calculated values are processed as absolute values by absolute value generating circuits 17a to 17g and then input to accumulative adder circuits 18a to 18g. In short, at the 14th cycle, the values $[(A_*/2)+\{(A_7/2)-a_{14}\}]$ (where *=0, 1, 2, 6, 8, 12, 13, 14) of the first term on the equation (8) are respectively input to the accumulative-adder circuits 18h to 18a.

Further, at the 15th to 17th cycles, $[(A_1/2)+\{(A_8/2)-a_{15}\}]$ =$\lceil$ second term of the right side of the sum (–0.5,–0.5) of the equation (8)$\rfloor$, $[(A_2/2)+\{(A_9/2)-a_{16}\}]$=third term (not shown in the equation (8)$\rfloor$ of the right side $\lceil$ sum (–0.5,–0.5) on the equation (8)$\rfloor$ and $[(A_8/2)+\{(A_{10}/2)-a_{17}\}]$=$\lceil$ fourth term (not shown in the equation (8) of the right side of sum (−0.5, −0.5) of the equation (8)] are respectively input to and accumulatively added by, for example, the accumulative adder 18h.

On the other hand, at the 18th and 19th cycles, [(A$_4$/2)+ {(A$_{11}$/2)−a$_{18}$}] and [(A$_{12}$/2)+{(A$_{12}$/2)−a$_{19}$}] are input to the accumulative-adder 18h but these values do not appear in the right side of the sum (−0.5.−0.5) of the equation (8). Accordingly, at these cycles, the enable control signal from the terminal 19 is made low in level (off) so that these undesirable data are inhibited from being accumulatively added. Incidentally, a$_{18}$ and a$_{19}$ are dummy data.

At the 20th to 23rd cycles, values of ⌈5th to 8th terms of the right side of sum (−0.5, −0.5) of the equation (8)⌋ are input to and then accumulatively added to the accumulatively-added result by the accumulative-adder 18h. Since undesirable data are input to the accumulative-adder 18h at the 24th and 25th cycles, by making the enable control signal from the terminal 19 low in level (off), these undesirable data can be inhibited from being accumulatively added to the accumulatively-added result. Further, at the 26th to 29th cycles, values of ⌈9th to 12th terms of the right side of sum (−0.5, −0.5) on the-equation (8)⌋ are input to and accumulatively added to the existing accumulatively added result. Since undesirable data are input to the accumulative-adder 18h at the 30th and 31st cycles, by making the enable control signal at the terminal 19 low in level (off), these undesirable data can be inhibited from being accumulatively added to the existing accumulatively added result. At the 32nd to 35th cycles, values of ⌈13th to 16th (final) terms of the right side of the sum (−0.15, −0.5) of the equation (8)⌋ are input and then accumulatively added to the existing accumulatively added result. Thus, the accumulative-adder 18h generates the value of sum (−0.5, −0.5) at the completion of the 35th cycle.

Figures 14, 15:
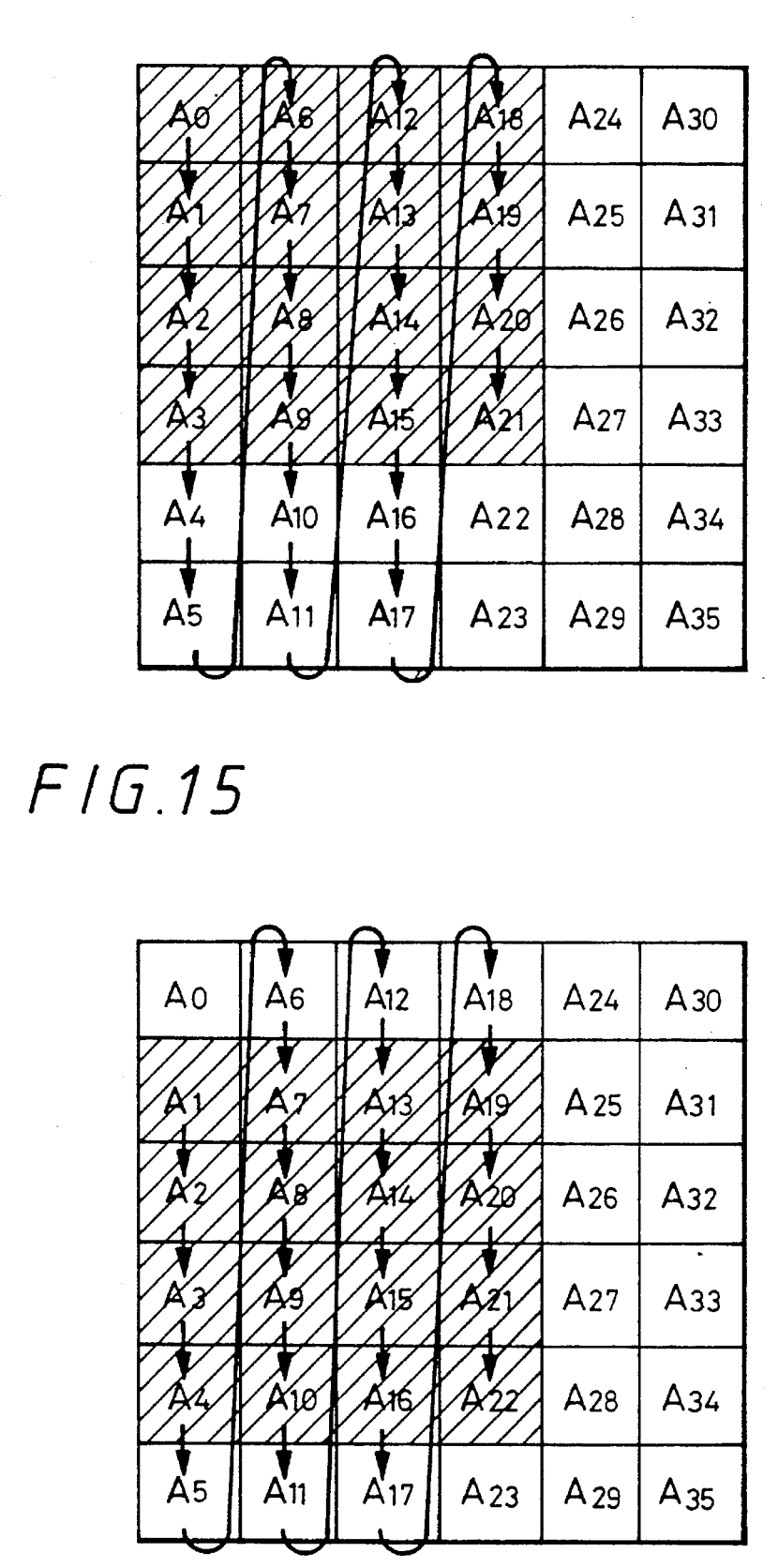

In the above-mentioned second embodiment of the motion detecting apparatus, during the 14th to 35th cycles, the register 13n derives the values of A$_0$ to A$_{21}$ shown by arrows in FIG. 14 in the form of ½ time of the data input to the input terminal 10. Then, the accumulative-adder 18h accumulatively adds the values shown by the hatched areas in FIG. 14 according to the following equation:

$$\text{sum } (-0.5, -0.5) = \Sigma |(A_I/2) + \{(A_J/2) - a_K\}| \quad (9)$$

where I, J and K are the values of the 16th term appearing in the equation (8). The values of A$_4$, A$_5$, A$_{10}$, A$_{11}$, A$_{16}$, A$_{17}$ (18th, 19th, 24th, 25th, 30th and 31st cycles) are not accumulatively added because the enable control signal is made low in level (off).

During the 14th to 35th cycles, the register 13m derives the values of A$_1$ to A$_{22}$ shown by arrows in FIG. 15 in the form of ½ time of the data input to the input terminal 10. Then, the accumulative-adder 18g accumulatively adds the values shown by the hatched areas in FIG. 15 according to the following equation:

$$\text{sum } (-0.5, 0) = \Sigma |(A_I/2) + \{(A_J/2) - a_K\}| \quad (10)$$

where I, J and K are the values of the 16th term appearing on the equation (8). The values of A$_5$, A$_6$, A$_{11}$, A$_{12}$, A$_{17}$, A$_{18}$ (18th, 19th, 24th, 25th, 30th and 31st cycles) are not accumulatively added because the enable control signal at the terminal 19 is made low in level (off).

Figure 16:
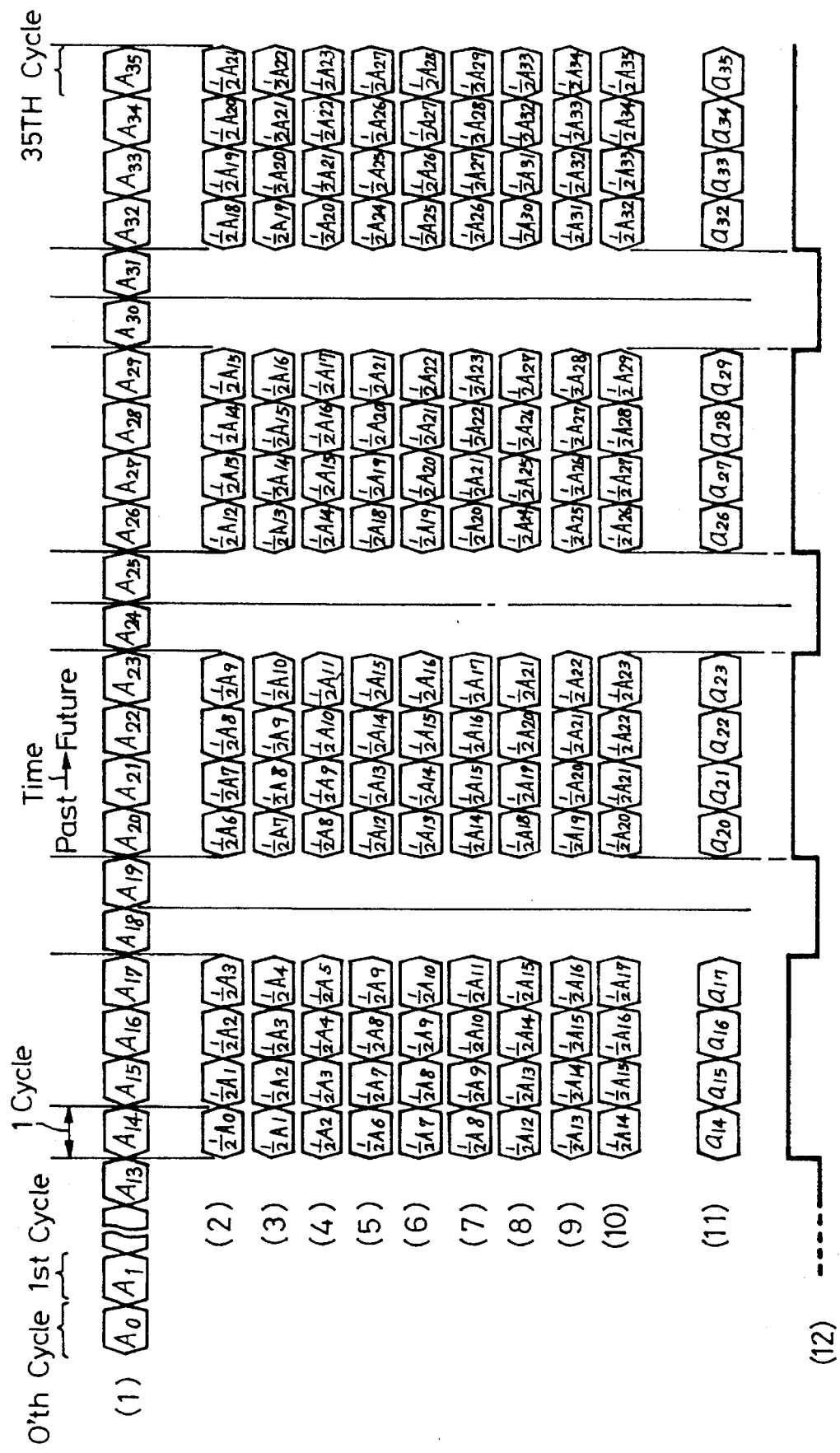
FIG. 16 is a timing chart used to explain operation of the second embodiment of the motion detecting apparatus according to the present invention.

With respect to other values, the calculations are similarly carried out by the accumulative-adders 18a to 18f and the whole timing chart is represented in FIG. 16. In FIG. 16, (1) represents the values input to the input terminal 10, (2) to (10) represent values which result from dividing the data of the registers 13n, 13m, 13l, 13h, 13g, 13f, 13b, 13a and the data A by half (½), (11) represents the values input to the input terminal 15 and (12) represents the enable control signal input to the input terminal 19.

At the same time when the calculations of the sum (., .) at the eight accumulative-adders 18a to 18h are ended, the value of sum (0, 0)=S is input from the input terminal 20 and the comparing circuit 30 compares these nine values to detect the minimum vector.

As described above, according to the second embodiment of the motion detecting apparatus, since the calculation is simplified by allowing the common processing (subtracter 16) among the respective corresponding states with priority, the motion detection of half pel accuracy can be carried out by the motion detecting apparatus of simple arrangement.

Figure 17:
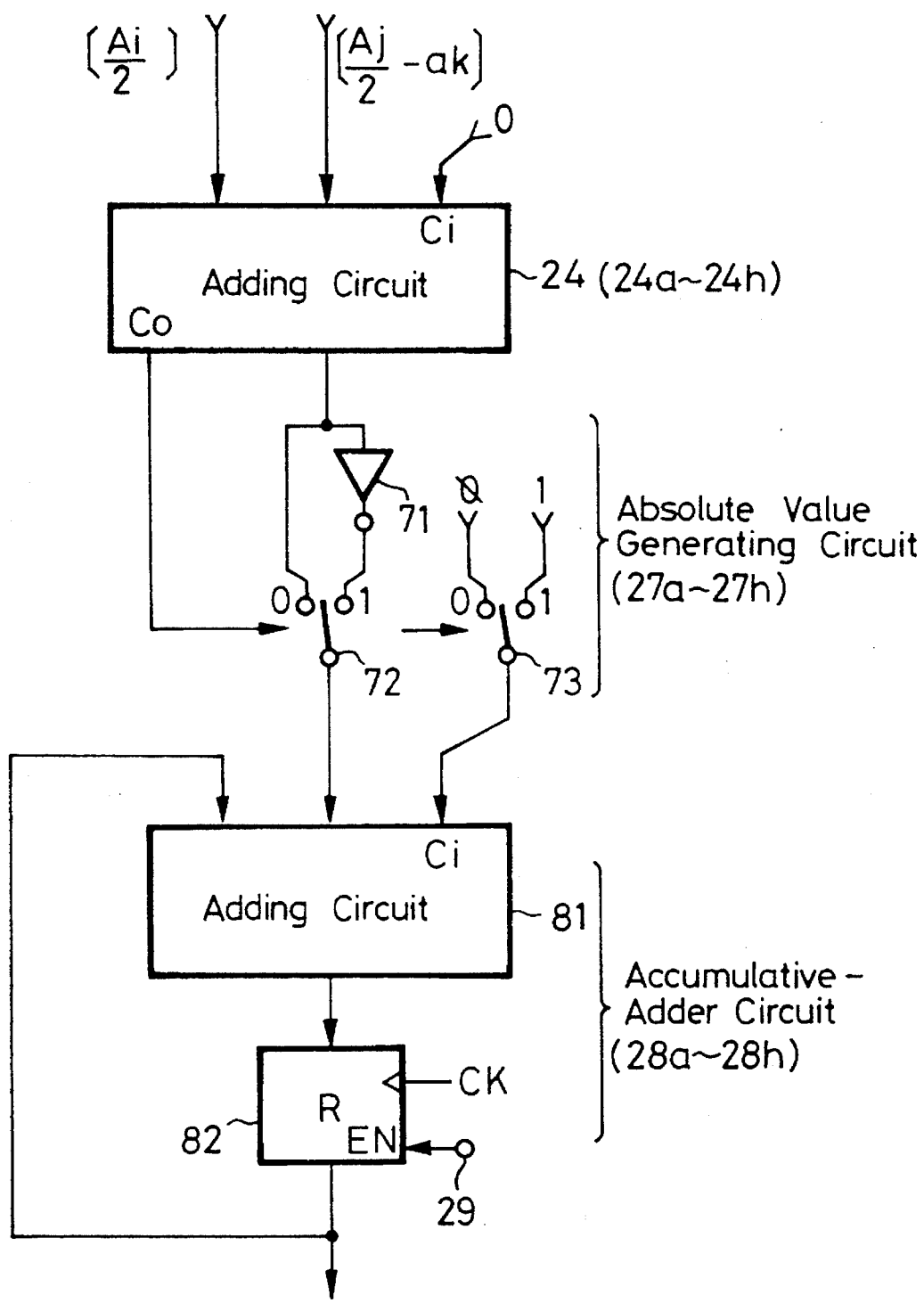
FIG. 17 is a block diagram showing an arrangement of a main portion of the second embodiment of the motion detecting apparatus according to the present invention.

In the above-mentioned second embodiment of the motion detecting apparatus, the adders 14a to 14h, the absolute value generating circuits 17a to 17h and the accumulative-adders 18a to 18h can be realized as, for example, shown in FIG. 17.

More specifically, as shown in FIG. 17, the addition of (A$_I$/2) and {(A$_J$/2)−a$_K$} is carried out by an adder 24 at an upper stage. If a carry out (code bit: Co) of the adder 24 is [0], then this added value is positive and is therefore input to an adder 81 at a lower stage directly. If on the other hand the carry out (Co) of the adder 24 is [1], then this added value is negative. Accordingly, a value, which results from inverting this added value by an inverter 71, is selected by a switch 72 and this value is supplied to the adder 81 of the lower stage. Also, a value [1] selected by a switch 73 is supplied to the lowest-order side (carry in: Ci) of the adder 81, whereby the value from the adder 24 is converted into the absolute value, which is then input to the adder 81.

Furthermore, the output of the adder 81 is fed through a unit delay element (register) 82 back thereto. The register 82 is provided with an enable terminal EN and an enable control signal from a terminal 29 is supplied to the enable terminal EN, whereby the accumulative addition in which undesirable values are inhibited from being added is carried out.

Only one system of this calculating circuit is illustrated in FIG. 17. When 8 values are calculated as described above, 8 systems of this calculating circuits are provided in parallel. Alternatively, if there is a tolerance in the calculation processing time, the calculating circuit can be realized only by one system according to the eightfold time division multiplexing manner. In that case, the circuit can be reduced to about ⅛ in scale. In addition, while the reference data block is formed of 4×4 pixels as described above, this reference data block can be generalized to provide an arbitrary reference data block of g×p pixels.

According to the second embodiment of this invention, since the calculation is simplified by allowing the common processing among the respective corresponding states with priority, the motion detection of half pel accuracy can be carried out by the motion detecting apparatus of simple arrangement.

A third embodiment of the motion detecting apparatus according to the present invention will be described hereinafter.

Figure 18:
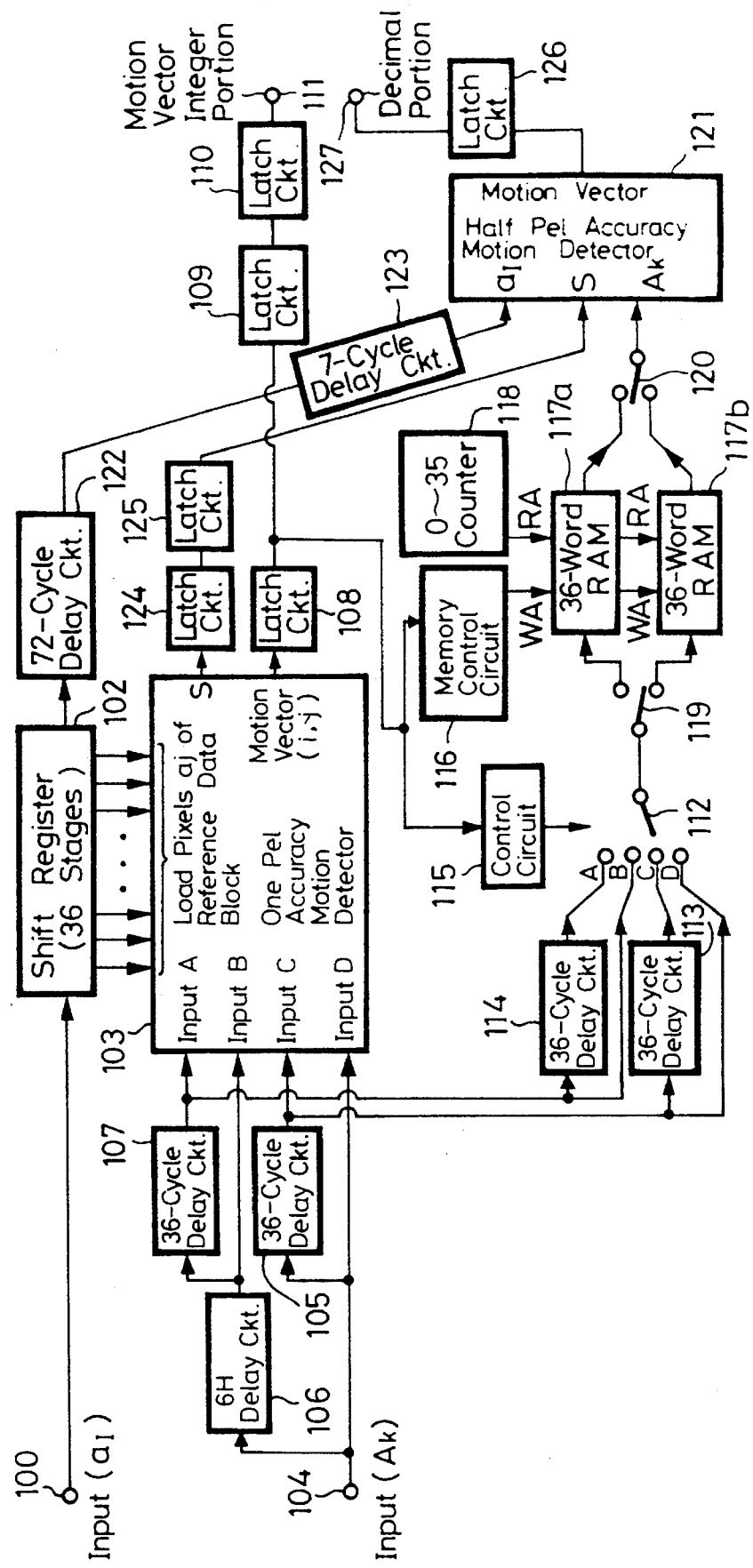
FIG. 18 is a schematic block diagram showing an arrangement of a third embodiment of the motion detecting apparatus according to the present invention.

FIG. 18 shows in block form an arrangement of the third embodiment of the motion detecting apparatus according to the present invention. While the search range is formed of 11×11 pixels and the reference data block is formed of 6×6 pixels in the third embodiment, it is needless to say that the search range and the reference data block can be generalized (i.e., search range is formed of e×f pixels and reference data block is formed of g×p pixels).

Referring to FIG. 18, an input terminal 100 is supplied with 36 pixels $a_I$ (I=0 to 35) of reference data block in the sequential order from $a_0$ shown in FIG. 19. The pixels $a_I$ input to the input terminal 100 are stored in a shift register 102 of 36 stages and then fed to a motion detecting circuit 103 of one pel accuracy.

Figure 20A:
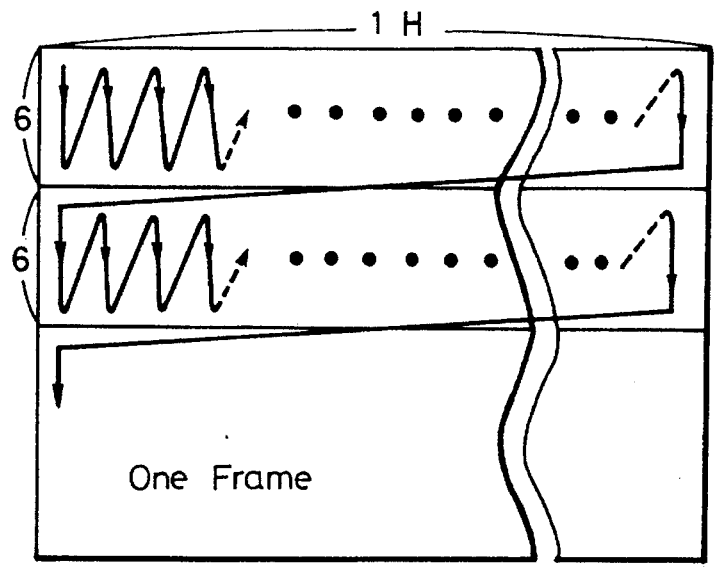
FIGS. 20A and 20B are schematic diagrams used to explain a search range, respectively.
Figure 20B:
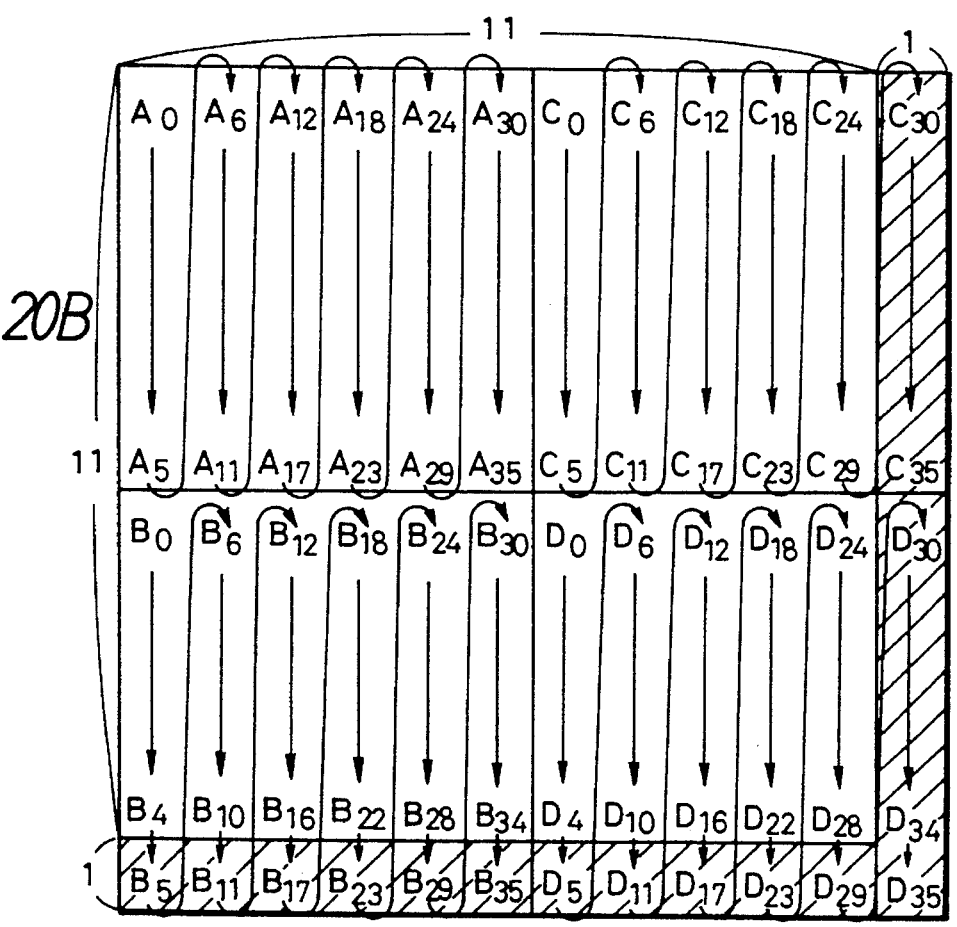

Further, pixels (one frame-preceding pixels) of the search range are supplied to an input terminal 104 in the sequential order shown, for example, in FIG. 20A. The respective pixels from the input terminal 104 are supplied to an input terminal D of the motion detecting circuit 103 and also supplied through a delay circuit 105 having a delay time of 36 cycle periods to an input terminal C of the motion detecting circuit 103. Also, the respective pixels from the input terminal 104 are supplied through a delay circuit 106 having a delay time of 6 horizontal periods to an input terminal B of the motion detecting circuit 103 and supplied through a further delay circuit 107 having a delay time of 36 cycle periods to an input terminal A of the motion detecting circuit 103. Accordingly, the motion detecting circuit 103 is supplied with respective pixels as shown in FIG. 20B. If the search range is formed of 11×11 pixels, then respective pixels of $B_5 \ldots B_{35}$, $C_{30}$ to $C_{35}$, $D_5 \ldots D_{29}$ to $C_{35}$ shown by hatched areas are pixel data outside of the search range and then regarded as dummy data, respectively.

Thus, the motion detecting circuit 103 carries out the motion detection of one pel accuracy. More specifically, this motion detecting circuit 103 includes, for example, 36 difference absolute value calculating circuits and accumulative-adders and a comparing circuit which compares these accumulatively-added values and calculates the following equation (11) in response to values of the respective pixels $a_I$ supplied thereto from the above-mentioned shift register 102 and values of the respective pixels $A_k$ to $D_K$ supplied to the input terminals A to D:

$$\Sigma |X_K - a_I| \qquad (11)$$

where X=A to D, K, I=0 to 35. Therefore, a motion vector (i,j) of one pel accuracy in which the accumulatively added value becomes minimum is detected. The motion vector (i,j) thus detected of one pel accuracy is supplied through latch circuits 108 to 110 to an output terminal 111 of an integer portion of the motion vector.

Figures 21A, 21B:
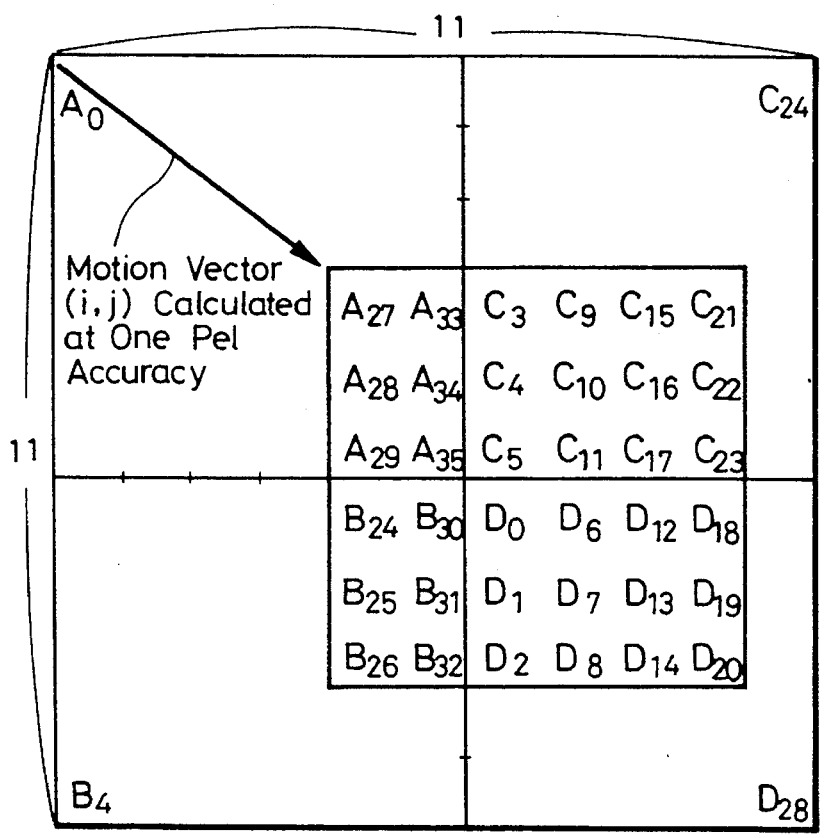
FIGS. 21A and 21B are respectively diagrams showing a search range of a second stage in which a motion is detected at one pel accuracy.

On the other hand, the respective pixels from the delay circuit 105 are supplied to a contact D of a change-over switch 112 and also supplied through a delay circuit 113 having a delay time of 36 cycle periods to a contact C of the change-over switch 112. Further, the respective pixels from the delay circuit 107 are supplied to a contact B of the change-over switch 112 and also supplied through a delay circuit 114 having a delay time of 36 cycle periods to a contact A of the change-over switch 112. The motion vector (i,j) thus detected of one pel accuracy is supplied through the latch circuit 108 to a control circuit 115 and the change-over switch 115 is selectively connected to the contacts A to D in response to the signal from the control circuit 115. Thus, respective pixels $A_K$ to $D_K$ shown in FIG. 21A are supplied from the change-over switch 112 in response to the motion vector (i,j) in the sequential order of suffixes.

Further, the motion vector (i,j) of one pel accuracy from the latch circuit 108 is supplied to a memory control circuit 116 and a write address (WA) generated by this memory control circuit 116 is supplied to RAMs (random access memories) 117a and 117b, each having a storage capacity of 36 words. Thus, the pixels $A_K$ to $D_K$ supplied from the change-over switch 112 in the sequential order of suffixes (see FIG. 21A) are written in the respective addresses of the RAMs 17a and 17b as shown in FIG. 21B. A ring counter 118 is adapted to generate values of 0 to 35, and the values from the ring counter 118 are supplied to read addresses (RA) of the RAMs 117a and 117b. Thus, the respective pixels $A_K$ to $D_K$ written are read out from the RAMs 117a and 117b as pixels $A'_K$ shown in FIG. 21B in the sequential order of suffixes. Incidentally, switches 119 and 120 are adapted to switch the RAMs 117a and 117b at every 36 cycles in a bank fashion so that the reading and/or writing is alternately carried out, which can make the processing continuous.

The respective pixels $A'_K$ from the switch 120 are supplied to a motion detecting circuit 121 of half pel accuracy. Also, the respective pixels $a_I$ of reference data block passed through the shift register 102 are supplied through a delay circuit 122 having delay time of 72 cycle periods and a delay circuit 123 having delay time of 7 cycle periods to the motion detecting circuit 121 of half pel accuracy. Further, the residual S provided when the motion vector (i,j) of one pel accuracy is detected by the motion detecting circuit 103 of one pel accuracy is supplied through latch circuits 124, 125 to the motion detecting circuit 121 of half pel accuracy.

Therefore, the motion detecting circuit 121 carries out the motion detection of half pel accuracy on the basis of 16 pixels of I=7 to 10, 13 to 16, 19 to 22 and 25 to 28 shown in FIG. 22 provided as a new reference data block in the 36 pixels $a_I$ of the reference data block. More specifically, this motion detecting circuit 121 includes a subtracting circuit, 8 mean value calculating circuits, absolute value calculating circuits, accumulative adder and a comparing circuit which compares these accumulatively added values and the above-mentioned residual S. Then, in response to the values of the respective pixels aI supplied from the above-mentioned shift register 102 and the values of the respective pixels $A'_K$ from the switch 120, this motion detecting circuit 121 calculates the following equation (12):

$$\Sigma |(A'_K/2) + (A'_{K^*}/2) - a_I| \qquad (12)$$

where K, I=7 to 10, 13 to 16, 19 to 22 and 25 to 28 and K* the values of K in the surrounding 8 directions. As a consequence, a motion vector of half pel accuracy in which the accumulatively-added values and the residual S become minimum is detected. Then, the motion vector thus detected of half pel accuracy is supplied through a latch circuit 126 to an output terminal 127 of a decimal portion of the motion vector.

FIGS. 23A–O show the entire timing chart of this motion detecting apparatus. That is, FIG. 23A shows a value input to the input terminal 100, FIGS. 23 B–E show values input to the input terminals A to D of the motion detecting circuit 103, respectively, FIG. 23F shows motion vector (i,j) of one pel accuracy from the latch circuit 108, FIGS. 23G–J show values supplied to the terminals A to D of the switch 112, respectively, FIG. 23K shows a value derived from the delay circuit 122 of 72 cycle periods, FIG. 23L shows a residual S provided by the latch circuit 125 when the motion vector (i,j) of one pel accuracy is detected, FIG. 23M shows a value derived from the switch 120, FIG. 23N shows an integer portion of the motion vector developed at the output terminal 111 and FIG. 23O shows a decimal portion of the motion vector developed at the output terminal 127.

Figures 24A, 24B, 24C, 24D, 24E, 24F, 24G, 24H, 24I, 24J, 24K, 24L, 24M, 24N:
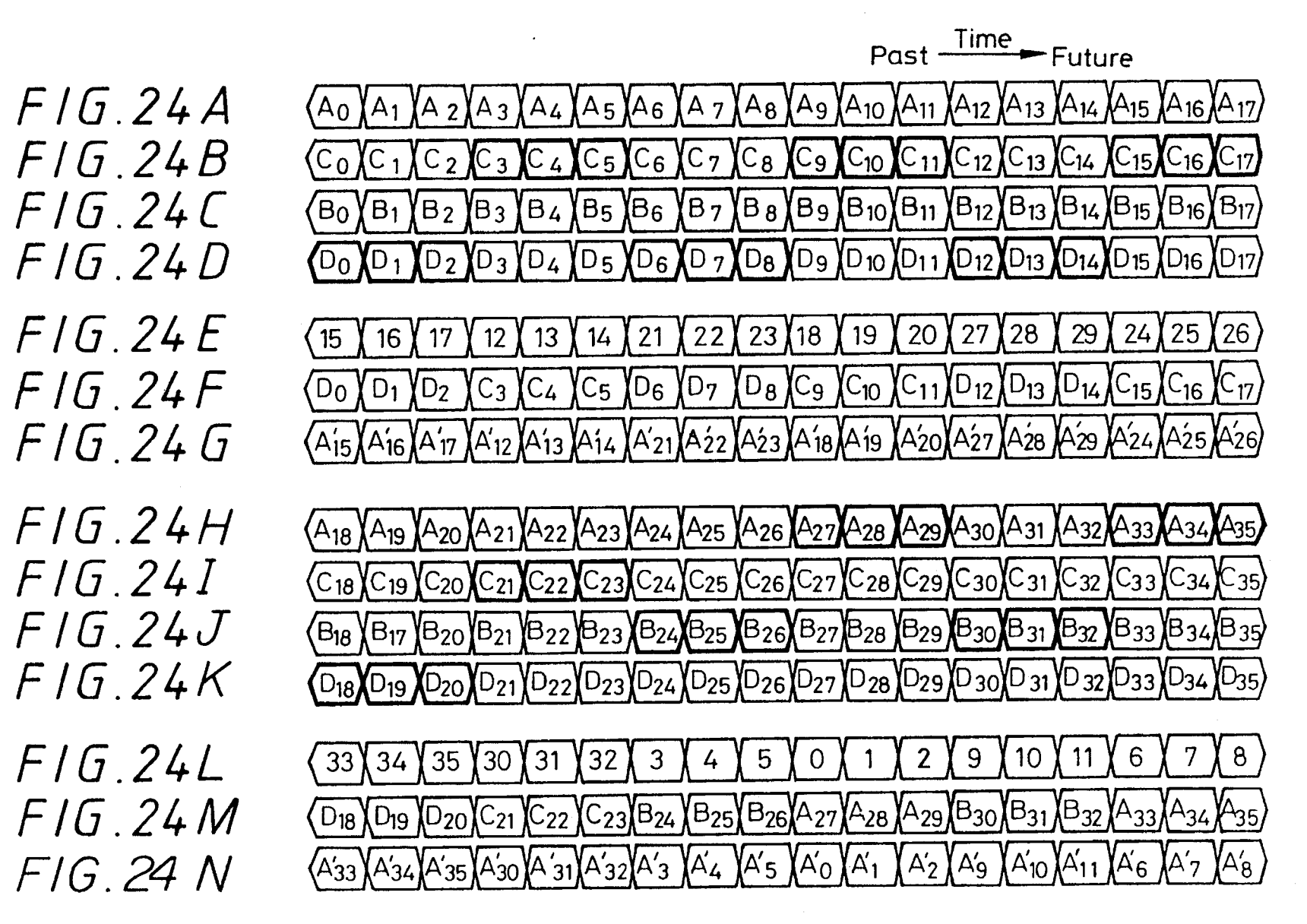

On the other hand, FIGS. 24A–N show a timing chart between the switches 112 and 120. FIGS. 24A–D show values supplied to the terminals A to D of the switch 112. When the switch 112 is controlled by the signal from the control circuit 115, values shown by bold blocks in FIGS. 24A–G are derived from the switch 112. Further, FIG. 24E shows the write address (WA) supplied to the RAMs 117a and 117b, whereby the inputs to the RAMs 117a and 117b shown in FIG. 24F are written in these addresses to generate the values $A'_K$ shown in FIG. 24G. The values $A'_K$ are derived from the switch 120 in the sequential order of suffixes.

As described above, according to the third embodiment of the motion detecting apparatus, since the number of the pixels of the second reference data block (delay circuit 122) is made smaller than that of the pixels supplied to the first reference data block (input terminal 100), the number of the processing cycles in the second processing means (motion detecting circuit 121 of half pel accuracy) can be made equal to that of the processing cycles in the first processing means (motion detecting circuit 103 of one pel accuracy) and the problems of processing speed and of image data transfer can be solved, which can make it possible to carry out the motion detection of half pel accuracy by the simple arrangement.

That is, according to the above-mentioned third embodiment, the numbers of processing cycles of the first processing means (motion detecting circuit 103 of one pel accuracy) and of the second processing means (motion detecting circuit 121 of half pel accuracy) can both be made 36 cycles, which can make it possible to carry out the motion detection of half pel accuracy in a real time fashion.

Figure 25:
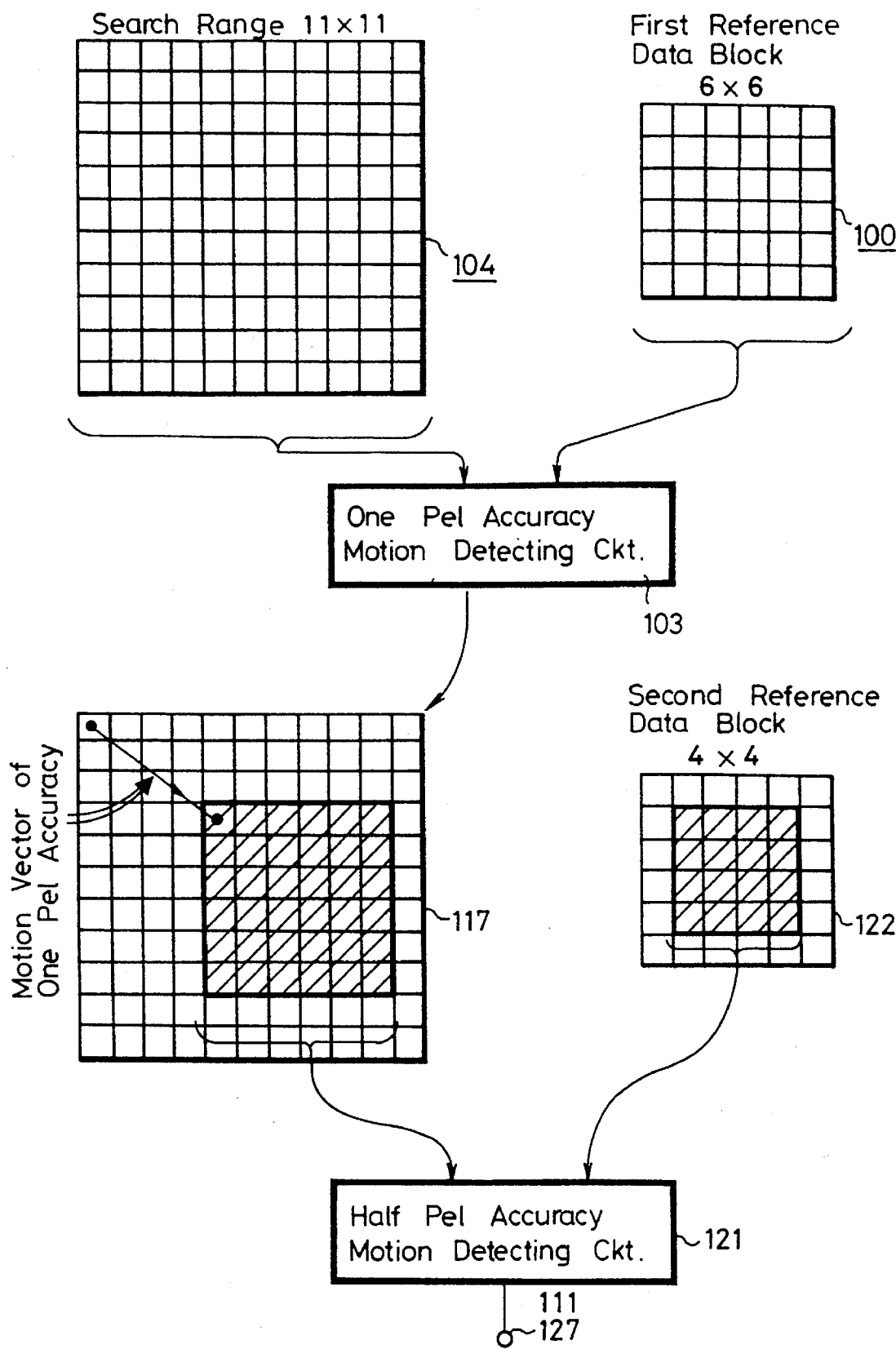
FIG. 25 is a conceptual diagram of the third embodiment of the motion detecting apparatus according to the present invention.

FIG. 25 shows a conceptual diagram of the above-mentioned third embodiment of the motion detecting apparatus.

As shown in FIG. 25, data of the first reference data block of 6×6 pixels supplied, for example, to the input terminal 100 and data of the search range of 11×11 pixels supplied to the input terminal 104 are supplied to the motion detecting circuit 103 of one pel accuracy which then detects the motion vector of one pel accuracy. Further, 6×6 pixels corresponding to the motion vector of one pel accuracy detected by the motion detecting circuit 103 are supplied to the motion detecting circuit 121 of half pel accuracy as the search range (shown by hatched areas: contents of RAMs 117a and 117b), and the motion detecting circuit 121 of half pel accuracy detects a motion vector of half pel accuracy on the basis of 4×4 pixels (shown by the hatched areas) of the respective pixels from the delay circuit 122 as the second reference data block. Then, the motion vectors of one pel accuracy and of half pel accuracy thus detected are delivered to the output terminals 111 and 127, respectively.

While the search range is formed of 11×11 pixels and the first reference data block is formed of 6×6 pixels as described above, the present invention is not limited thereto and the search range may be generalized as e×f pixels and the reference data block may be generalized as g×p pixels. Further, in the above-mentioned third-embodiment of the motion detecting apparatus, the motion detecting circuit 103 of one pel accuracy and the motion detecting circuit 121 of half pel accuracy are not limited thereto and may be applied to arbitrary apparatus.

According to the third embodiment of this invention, since the number of the pixels of the second reference data block is made smaller than that of the pixels of the first reference data block, the number of the processing cycles in second processing means can be made equal to the processing cycles in the first processing means and the problems of processing speed and of image data transfer can be solved, which can make it possible to carry out the motion detection of half pel accuracy by the simple arrangement.

Having described the preferred embodiments of the invention with reference to the accompanying drawings, it is to be understood that the invention is not limited to those precise embodiments and that various changes and modifications thereof could be effected by one skilled in the art without departing from the spirit or scope of the novel concepts of the invention as defined in the appended claims.

What is claimed is:

1. A motion detecting apparatus in which pixels within a search range formed of a predetermined number of pixels and pixels within a reference data block, the number of which is smaller than said predetermined number of pixels, are compared based on the arrangement thereof, comprising:

processing means for processing absolute values of respective differences between pixels within said search range and pixels within the reference data block;

summing means for summing processed absolute values from said processing means and producing a plurality of output sums;

and comparing means for respectively comparing the output sums from said summing means to determine a minimum value to thereby detect a motion state on the basis of said compared minimum value, characterized in that said processing means includes switching selector means connected to select a number of pixels equal to the number of pixels in the reference data block from among said pixels within said search range including arbitrary dummy data for pixels outside and adjacent said search range in response to timing signals fed thereto, so that selected pixels within said search range are input to a plurality of absolute value calculating means equal in number to the number of pixels said in reference data block included in said processing means at a set time and over a number of inputs fewer in number than the number of pixels in said reference data block and selected by said selector means, thereby being sequentially processed with corresponding pixels within said reference data block.

2. A motion detecting apparatus according to claim 1, wherein the pixels within said search range and the pixels within said reference data block are compared independent of a corresponding state of the pixels and dependent upon an order determined by said timing signals connected to said selector means.

3. A motion detecting apparatus according to claim 1, wherein the pixels within said reference data block are pixels of a present field and the pixels within said search range are one field or more preceding the present field.

4. A motion detecting apparatus according to claim 1, wherein the pixels within said reference data block are pixels of a present field and the pixels within said search range are one field or more following the present field.

5. A motion detecting apparatus in which pixels within a search range formed of a predetermined number of pixels and pixels within a reference data block, the number of which is smaller than said predetermined number of pixels, are compared on the basis of predetermined order in time, comprising:

processing means for processing sums of absolute values of differences between pixels within said reference data block and corresponding pixels within said search range, said processing means including a switching circuit having inputs fewer in number that the number of pixels in the reference data block connected to data of said pixels within said search range including arbitrary dummy data for pixels outside and adjacent said search range and operable in response to timing signals to output selected pixels within said search range equal in number to the pixels in the reference data block so that each of the selected pixels within said search range is input to said processing means at a predetermined input cycle to thereby sequentially process absolute value differences between corresponding pixels within said reference data block and the selected pixels within said search range, characterized by means for detecting a motion within said search range and in response thereto comparing a mean value between adjacent pixels and the pixel within said reference data block, said difference absolute value being obtained at successively different search ranges with respect to the pixels within said reference data block and a common processing between said successively different search ranges is carried out based on a predetermined priority.

6. A motion detecting apparatus comprising:

first processing means for processing sums of absolute values of differences between pixels within a search range and pixels within a first reference data block of a number smaller than a predetermined number of pixels within the search range when pixels within the search range equal in number to the pixels in the first reference data block are compared with the pixels of the first reference data block in an order determined by timing signals fed to a switching selector means included in said first processing means, said selector means having a plurality of inputs fewer in number than the number of pixels in the first reference data block for receiving data of the pixels in said search range and including arbitrary dummy data for pixels adjacent said first search range; and second processing means for comparing a mean value of adjacent pixels and pixels within a second reference data block in response to detection of a motion of sub-pixel accuracy within said search range to thereby obtain a difference absolute value sum with respect to the pixels within said second reference data block, wherein the number of pixels of said second reference data block is smaller than the number of pixels within said first reference data block.

* * * * *